US008498665B2

(12) United States Patent
Ito

(10) Patent No.: US 8,498,665 B2
(45) Date of Patent: Jul. 30, 2013

(54) INFORMATION PROVIDING DEVICE, METHOD THEREFOR, PROGRAM, AND STORAGE MEDIUM

(75) Inventor: Isao Ito, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/380,674

(22) PCT Filed: Jun. 18, 2010

(86) PCT No.: PCT/JP2010/060386
§ 371 (c)(1),
(2), (4) Date: Dec. 23, 2011

(87) PCT Pub. No.: WO2010/150711
PCT Pub. Date: Dec. 29, 2010

(65) Prior Publication Data
US 2012/0115458 A1 May 10, 2012

(30) Foreign Application Priority Data
Jun. 23, 2009 (JP) ................................. 2009-148287

(51) Int. Cl.
*H04M 1/00* (2006.01)
(52) U.S. Cl.
USPC ...... 455/550.1; 455/419; 455/418; 340/10.42

(58) Field of Classification Search
USPC ..................... 455/550.1, 419, 418; 340/10.42
See application file for complete search history.

(56) References Cited

U.S. PATENT DOCUMENTS

| 2005/0071278 | A1* | 3/2005 | Simelius | 705/52 |
| 2008/0208755 | A1* | 8/2008 | Malcolm | 705/59 |
| 2008/0263175 | A1* | 10/2008 | Naono et al. | 709/217 |
| 2008/0313723 | A1* | 12/2008 | Naono et al. | 726/7 |

FOREIGN PATENT DOCUMENTS

WO 2006137740 A1 12/2006

OTHER PUBLICATIONS

European Search Report issued Mar. 13, 2013 in corresponding European Patent Application No. 10792029.

* cited by examiner

*Primary Examiner* — Danh Le
(74) *Attorney, Agent, or Firm* — Sughrue Mion, PLLC

(57) ABSTRACT

User group DB (70) stores a serial number of the mobile phone of the user. Action DB (69) stores an individual identification number for identifying RFID which is set up by a service provider and an action associated with the individual identification number. A web server function (61) controls reception of the serial number and the individual identification number, which are transmitted from the mobile phone; and a service providing section (67) executes, when the serial number and the individual identification number are received, an action of providing a service of the service provider to the mobile phone of the user.

8 Claims, 18 Drawing Sheets

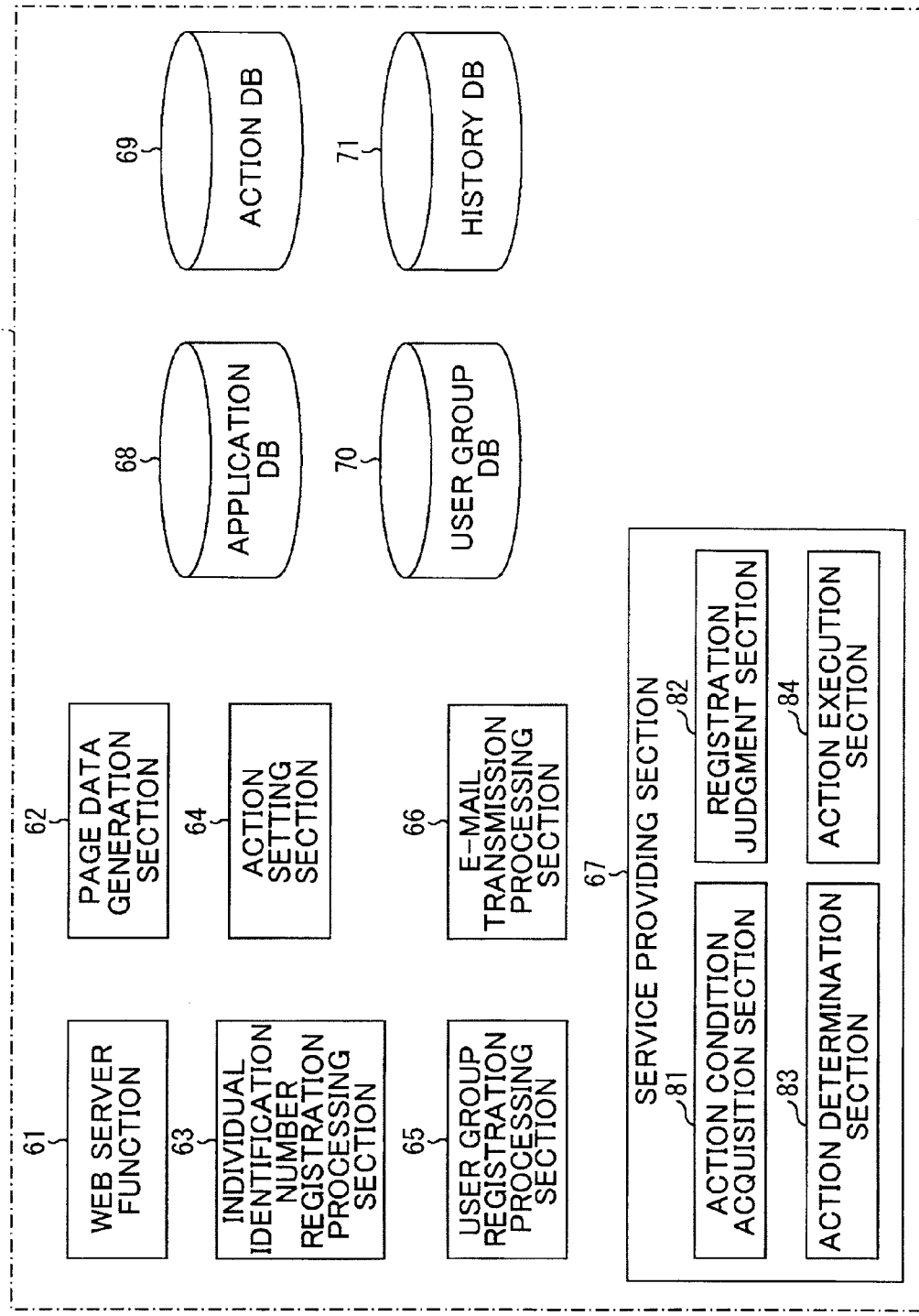

FIG.4

| INDIVIDUAL IDENTIFICATION NUMBER | SHOP ID | PERMISSION | FLAG | PERMISSION | FLAG | PERMISSION | FLAG | PERMISSION | FLAG | ACTION |
|---|---|---|---|---|---|---|---|---|---|---|
| AAA100001 | S555777 |  |  |  |  |  |  |  |  | DISTRIBUTE SHOP CAMPAIGN ADVERTISEMENT TO USER GROUP |
| AAA100002 | S555777 | ACCESS COUNT OF USER GROUP N=0 | 1 | CAMPAIGN PERIOD | 1 | A=RAND*1.2 | A≧1 |  |  | DISTRIBUTE COUPON TO USER GROUP + SET ACCESS COUNT OF USER GROUP IN HISTORY DB |
|  |  | ACCESS COUNT OF USER GROUP N=0 | 1 | CAMPAIGN PERIOD | 1 | A=RAND*1.2 | A<1 |  |  | DISTRIBUTE LOST-LOTTERY PAGE TO USER GROUP + SET ACCESS COUNT OF USER GROUP IN HISTORY DB |
|  |  | ACCESS COUNT OF USER GROUP N=0 | 1 | CAMPAIGN PERIOD | 0 |  |  |  |  | TRANSMIT PAGE INDICATING THAT COUPON DISTRIBUTION PERIOD HAS EXPIRED TO USER GROUP |
|  |  | ACCESS COUNT OF USER GROUP N=0 | 0 |  |  |  |  |  |  | DISTRIBUTE PAGE INDICATING CONFIRMATION OF USER'S PARTICIPATION IN USER GROUP |
| AAA100003 | S555777 | ACCESS COUNT OF USER GROUP N=0 | 1 | CAMPAIGN PERIOD | 1 |  |  |  |  | DISTRIBUTE POINT-GET URL TO USER GROUP + SET ACCESS COUNT OF USER GROUP IN HISTORY DB |
|  |  | ACCESS COUNT OF USER GROUP N=0 | 1 | CAMPAIGN PERIOD | 0 |  |  |  |  | TRANSMIT PAGE INDICATING THAT CAMPAIGN IS FINISHED TO USER GROUP + SET ACCESS COUNT OF USER GROUP IN HISTORY DB |
|  |  | ACCESS COUNT OF USER GROUP N=0 | 0 |  |  |  |  |  |  | DISTRIBUTE ADVERTISEMENT TO USER GROUP |

FIG.5

| USER GROUP IDENTIFICATION NUMBER | USER COUNT | SERIAL NUMBER | | | | E-MAIL ADDRESS | | | | START TIMING | END TIMING |
|---|---|---|---|---|---|---|---|---|---|---|---|
| UGAA100001 | 2 | BBB100001 | BBB100002 | | | CCC1001@ddd | CCC1002@ddd | | | 200901011045 | 200901011245 |
| UGAA100002 | 4 | BBB100003 | BBB100005 | BBB100006 | BBB100007 | CCC1003@ddd | CCC1005@ddd | CCC1006@ddd | CCC1007@ddd | 200901021230 | 200901021430 |
| UGAA100003 | 2 | BBB100004 | BBB100008 | | | CCC1004@ddd | CCC1008@ddd | | | 200902032315 | 200902040115 |

FIG.13

| TAG GROUP IDENTIFICATION NUMBER | SHOP ID | PERMISSION | FLAG | PERMISSION | FLAG | PERMISSION | FLAG | ACTION |
|---|---|---|---|---|---|---|---|---|
| TGAA100001 | S555777 | | | | | | | DISTRIBUTE SHOP CAMPAIGN ADVERTISEMENT TO USER GROUP |
| TGAA100002 | S555777 | ACCESS COUNT OF USER GROUP N=0 | 1 | CAMPAIGN PERIOD | 1 | A=RAND*1.2 A≧1 | 1 | DISTRIBUTE COUPON TO USER GROUP + SET ACCESS COUNT OF USER GROUP IN HISTORY DB |
| | | ACCESS COUNT OF USER GROUP N=0 | 1 | CAMPAIGN PERIOD | 1 | A=RAND*1.2 A<1 | 1 | DISTRIBUTE LOST-LOTTERY PAGE TO USER GROUP + SET ACCESS COUNT OF USER GROUP IN HISTORY DB |
| | | ACCESS COUNT OF USER GROUP N=0 | 1 | CAMPAIGN PERIOD | 0 | | | TRANSMIT PAGE INDICATING THAT COUPON DISTRIBUTION PERIOD HAS EXPIRED TO USER GROUP |
| | | ACCESS COUNT OF USER GROUP N=0 | 0 | | | | | DISTRIBUTE PAGE INDICATING CONFIRMATION OF USER'S PARTICIPATION IN USER GROUP |
| TGAA100003 | S555777 | ACCESS COUNT OF USER GROUP N=0 | 1 | CAMPAIGN PERIOD | 1 | | | DISTRIBUTE POINT-GET URL TO USER GROUP + SET ACCESS COUNT OF USER GROUP IN HISTORY DB |
| | | ACCESS COUNT OF USER GROUP N=0 | 1 | CAMPAIGN PERIOD | 0 | | | TRANSMIT PAGE INDICATING THAT CAMPAIGN IS FINISHED TO USER GROUP + SET ACCESS COUNT OF USER GROUP IN HISTORY DB |
| | | ACCESS COUNT OF USER GROUP N=0 | 0 | | | | | DISTRIBUTE ADVERTISEMENT TO USER GROUP |

FIG.14

| SHOP ID | TAG GROUP IDENTIFICATION NUMBER | RFID COUNT | INDIVIDUAL IDENTIFICATION NUMBER | |
|---|---|---|---|---|
| S555777 | TGAA100001 | 2 | AAA100001 | AAA100002 |
| S555777 | TGAA100002 | 2 | AAA100003 | AAA100005 |
| S555777 | TGAA100003 | 3 | AAA100004 | AAA100006 | AAA100007 |

FIG. 17

| TAG GROUP IDENTIFICATION NUMBER | SHOP ID | INDIVIDUAL IDENTIFICATION NUMBER | TAG GROUP INDIVIDUAL IDENTIFICATION NUMBER | FLAG | TAG GROUP INDIVIDUAL IDENTIFICATION NUMBER | FLAG | PERMISSION | FLAG | ACTION |
|---|---|---|---|---|---|---|---|---|---|
| TGAA100001 | S555777 | AAA100001 | AAA100002 | 1 | | | ACCESS COUNT N=0 | 1 | DISTRIBUTE COUPON TO USER GROUP + SET ACCESS COUNT OF INDIVIDUAL IDENTIFICATION NUMBER IN HISTORY DB |
| | | | AAA100002 | 1 | | | | | DISTRIBUTE PAGE INDICATING CONFIRMATION OF USER'S PARTICIPATION IN USER GROUP |
| | | | AAA100002 | 0 | | | ACCESS COUNT N=0 | 0 | DISTRIBUTE "ONE MORE LEFT" PAGE TO USER GROUP + SET ACCESS COUNT OF INDIVIDUAL IDENTIFICATION NUMBER IN HISTORY DB |
| | | AAA100002 | AAA100001 | 1 | | | ACCESS COUNT N=0 | 1 | DISTRIBUTE COUPON TO USER GROUP + SET ACCESS COUNT OF INDIVIDUAL IDENTIFICATION NUMBER IN HISTORY DB |
| | | | AAA100001 | 1 | | | | | DISTRIBUTE PAGE INDICATING CONFIRMATION OF USER'S PARTICIPATION IN USER GROUP |
| | | | AAA100001 | 0 | | | ACCESS COUNT N=0 | 0 | DISTRIBUTE "ONE MORE LEFT" PAGE TO USER GROUP + SET ACCESS COUNT OF INDIVIDUAL IDENTIFICATION NUMBER IN HISTORY DB |
| TGAA100002 | S555777 | AAA100003 | AAA100005 | 1 | | | ACCESS COUNT N=0 | 1 | DISTRIBUTE COUPON TO USER GROUP + SET ACCESS COUNT OF INDIVIDUAL IDENTIFICATION NUMBER IN HISTORY DB |
| | | | AAA100005 | 1 | | | | | DISTRIBUTE PAGE INDICATING CONFIRMATION OF USER'S PARTICIPATION IN USER GROUP |
| | | | AAA100005 | 0 | | | ACCESS COUNT N=0 | 0 | DISTRIBUTE "ONE MORE LEFT" PAGE TO USER GROUP + SET ACCESS COUNT OF INDIVIDUAL IDENTIFICATION NUMBER IN HISTORY DB |
| | | AAA100005 | AAA100003 | 1 | | | ACCESS COUNT N=0 | 1 | DISTRIBUTE COUPON TO USER GROUP + SET ACCESS COUNT OF INDIVIDUAL IDENTIFICATION NUMBER IN HISTORY DB |
| | | | AAA100003 | 1 | | | | | DISTRIBUTE PAGE INDICATING CONFIRMATION OF USER'S PARTICIPATION IN USER GROUP |
| | | | AAA100003 | 0 | | | ACCESS COUNT N=0 | 0 | DISTRIBUTE "ONE MORE LEFT" PAGE TO USER GROUP + SET ACCESS COUNT OF INDIVIDUAL IDENTIFICATION NUMBER IN HISTORY DB |
| TGAA100003 | S555777 | AAA100004 | AAA100006 | 1 | AAA100007 | 1 | ACCESS COUNT N=0 | 1 | DISTRIBUTE COUPON TO USER GROUP + SET ACCESS COUNT OF INDIVIDUAL IDENTIFICATION NUMBER IN HISTORY DB |
| | | | AAA100006 | 1 | AAA100007 | 1 | | | DISTRIBUTE PAGE INDICATING CONFIRMATION OF USER'S PARTICIPATION IN USER GROUP |
| | | | AAA100006 | 0 | AAA100007 | 0 | ACCESS COUNT N=0 | 0 | DISTRIBUTE "ONE MORE LEFT" PAGE TO USER GROUP + SET ACCESS COUNT OF INDIVIDUAL IDENTIFICATION NUMBER IN HISTORY DB |
| | | | AAA100006 | 0 | AAA100007 | 1 | | | DISTRIBUTE "ONE MORE LEFT" PAGE TO USER GROUP + SET ACCESS COUNT OF INDIVIDUAL IDENTIFICATION NUMBER IN HISTORY DB |
| | | | AAA100006 | 0 | AAA100007 | 0 | | | DISTRIBUTE "TWO MORE LEFT" PAGE TO USER GROUP + SET ACCESS COUNT OF INDIVIDUAL IDENTIFICATION NUMBER IN HISTORY DB |
| | | AAA100006 | AAA100004 | 1 | AAA100007 | 1 | ACCESS COUNT N=0 | 1 | DISTRIBUTE COUPON TO USER GROUP + SET ACCESS COUNT OF INDIVIDUAL IDENTIFICATION NUMBER IN HISTORY DB |
| | | | AAA100004 | 1 | AAA100007 | 1 | | | DISTRIBUTE PAGE INDICATING CONFIRMATION OF USER'S PARTICIPATION IN USER GROUP |
| | | | AAA100004 | 0 | AAA100007 | 0 | ACCESS COUNT N=0 | 0 | DISTRIBUTE "ONE MORE LEFT" PAGE TO USER GROUP + SET ACCESS COUNT OF INDIVIDUAL IDENTIFICATION NUMBER IN HISTORY DB |
| | | | AAA100004 | 0 | AAA100007 | 1 | | | DISTRIBUTE "ONE MORE LEFT" PAGE TO USER GROUP + SET ACCESS COUNT OF INDIVIDUAL IDENTIFICATION NUMBER IN HISTORY DB |
| | | | AAA100004 | 0 | AAA100007 | 0 | | | DISTRIBUTE "TWO MORE LEFT" PAGE TO USER GROUP + SET ACCESS COUNT OF INDIVIDUAL IDENTIFICATION NUMBER IN HISTORY DB |
| | | AAA100007 | AAA100004 | 1 | AAA100006 | 1 | ACCESS COUNT N=0 | 1 | DISTRIBUTE COUPON TO USER GROUP + SET ACCESS COUNT OF INDIVIDUAL IDENTIFICATION NUMBER IN HISTORY DB |
| | | | AAA100004 | 1 | AAA100006 | 1 | | | DISTRIBUTE PAGE INDICATING CONFIRMATION OF USER'S PARTICIPATION IN USER GROUP |
| | | | AAA100004 | 0 | AAA100006 | 0 | ACCESS COUNT N=0 | 0 | DISTRIBUTE "ONE MORE LEFT" PAGE TO USER GROUP + SET ACCESS COUNT OF INDIVIDUAL IDENTIFICATION NUMBER IN HISTORY DB |
| | | | AAA100004 | 0 | AAA100006 | 1 | | | DISTRIBUTE "ONE MORE LEFT" PAGE TO USER GROUP + SET ACCESS COUNT OF INDIVIDUAL IDENTIFICATION NUMBER IN HISTORY DB |
| | | | AAA100004 | 0 | AAA100006 | 0 | | | DISTRIBUTE "TWO MORE LEFT" PAGE TO USER GROUP + SET ACCESS COUNT OF INDIVIDUAL IDENTIFICATION NUMBER IN HISTORY DB |

INFORMATION PROVIDING DEVICE, METHOD THEREFOR, PROGRAM, AND STORAGE MEDIUM

CROSS REFERENCE TO RELATED APPLICATIONS

This application is a National Stage of International Application No. PCT/JP2010/060386, filed on Jun. 18, 2010, which claims priority from Japanese Patent Application No. 2009-148287, filed on Jun. 23, 2009, the contents of all of which are incorporated herein by reference in their entirety.

TECHNICAL FIELD

The present invention relates to an information providing device, an information providing method, a program therefor, and a storage medium, and more particularly, to an information providing device, an information providing method, a program therefor, and a storage medium which enable provision of services in a shop or the like.

BACKGROUND ART

Identification (ID) tags of non-contact type have been widely used. A unique individual identification number is stored in the ID tag, and the individual identification number is read from the ID tag by a reader, to thereby provide information associated with the individual identification number.

In a case of providing a service with the use of an ID tag, a user carries an ID tag of card type, and, when the user uses the card-type ID tag, a service associated with the ID tag is provided to the user.

Conventionally, a radio frequency identification (RFID) reader of a communication device acquires information regarding a mobile phone stored in an RFID tag by using RFID wireless communication, and, based on the information thus acquired, a Bluetooth module of the communication device performs Bluetooth wireless communication with a Bluetooth module of the mobile phone to request the mobile phone to establish a dial-up connection. When the mobile phone has established a dial-up connection to a network, the Bluetooth module of the communication device provides an advertisement ID and an e-mail address of the mobile phone to an information providing server through the mobile phone and the network. The information providing server transmits, as e-mail, advertisement data associated with the advertisement ID to the e-mail address, to thereby provide the advertisement data to the mobile phone (for example, see Patent Literature 1).

PRIOR ART DOCUMENT

Patent Document

Patent Document 1: JP 2003-224677 A

DISCLOSURE OF THE INVENTION

Problems to be Solved by the Invention

However, conventionally, a service utilizing an ID tag can be provided only to a device from which the ID tag has been read. Further, a service utilizing an ID tag is determined in advance, and thus it is impossible to change the service from a shop.

In view of the above-mentioned circumstances, the present invention has been made so that, by utilizing an ID tag, a service provider can provide a desired service to customers in a shop, a service providing place, or the like.

Means for Solving the Problems

An information providing device according to one aspect of the present invention includes: first storage control means for controlling storing a terminal device identification number for specifying a terminal device of a user; second storage control means for controlling storing an individual identification number for identifying an ID tag of non-contact type which is set up by a service provider and an action associated with the individual identification number; reception control means for controlling reception of the terminal device identification number and the individual identification number, which are transmitted from the terminal device which has read the ID tag; and execution means for executing, when the terminal device identification number and the individual identification number are received, an action of providing a service of the service provider to the terminal device of the user belonging to the user group, which is identified by the terminal device identification number, the action being stored in association with the individual identification number.

The terminal device of the user may belong to a user group, the first storage control means may control storing an end timing of a valid period of the user group; the reception control means may control reception of a request for registration of the user group, the request being transmitted along with the terminal device identification number from the terminal device; and the action executed by the execution means may be, if a current time point is not past the end timing of the user group when the terminal device identification number and the individual identification number are received, provided to the terminal device of the user, the action being stored in association with the individual identification number.

The first storage control means may control storing the end timing, the end timing being obtained by adding a predetermined period of time to a time point at which the request for the registration of the user group is received.

The information providing device may further include third storage control means for controlling storing a count for each user group, which indicates a number of times the individual identification number has been received, and the execution means may cause the count for the each user group, which indicates the number of times the individual identification number has been received, to be stored, and may execute the action associated with the count for the each user group, which indicates the number of times the individual identification number has been received.

The second storage control means may control storing the individual identification number in association with a tag group to which the ID tag belongs; and the execution means may execute an action of providing a service to the terminal device of the user belonging to the user group, the action being stored in association with the individual identification number via the tag group.

The reception control means may control reception of a request for setting of the action, which is transmitted from an information processing device of the service provider; and the second storage control means may control storing the individual identification number and the action when the request for the setting of the action is made.

The reception control means may control reception of a request for change of the action, which is transmitted from an information processing device of the service provider; and the first storage control means may control storing the individual identification number and the action which has been subjected to the change.

An information providing method according to one aspect of the present invention includes: controlling storing a terminal device identification number for specifying a terminal device of a user; controlling storing an individual identification number for identifying an ID tag of non-contact type which is set up by a service provider and an action associated with the individual identification number; controlling reception of the terminal device identification number and the individual identification number, which are transmitted from the terminal device which has read the ID tag; and executing, when the terminal device identification number and the individual identification number are received, an action of providing a service of the service provider to the terminal device of the user, which is identified by the terminal device identification number, the action being stored in association with the individual identification number.

A program according to one aspect of the present invention controls a computer to perform information providing processing including: controlling storing a terminal device identification number for specifying a terminal device of a user; controlling storing an individual identification number for identifying an ID tag of non-contact type which is set up by a service provider and an action associated with the individual identification number; controlling reception of the terminal device identification number and the individual identification number, which are transmitted from the terminal device which has read the ID tag; and executing, when the terminal device identification number and the individual identification number are received, an action of providing a service of the service provider to the terminal device of the user, which is identified by the terminal device identification number, the action being stored in association with the individual identification number.

A storage medium according to one aspect of the present invention has a program stored therein, the program controlling a computer to perform information providing processing including: controlling storing a terminal device identification number for specifying a terminal device of a user; controlling storing an individual identification number for identifying an ID tag of non-contact type which is set up by a service provider and an action associated with the individual identification number; controlling reception of the terminal device identification number and the individual identification number, which are transmitted from the terminal device which has read the ID tag; and executing, when the terminal device identification number and the individual identification number are received, an action of providing a service of the service provider to the terminal device of the user, which is identified by the terminal device identification number, the action being stored in association with the individual identification number.

According to those aspects of the present invention, storing a terminal device identification number for specifying a terminal device of a user; storing an individual identification number for identifying an ID tag of non-contact type which is set up by a service provider and an action associated with the individual identification number; controlling reception of the terminal device identification number and the individual identification number, which are transmitted from the terminal device which has read the ID tag; and executing, when the terminal device identification number and the individual identification number are received, an action of providing a service of the service provider to the terminal device of the user belonging to the user group, which is identified by the terminal device identification number, the action being stored in association with the individual identification number.

Effect of the Invention

As has been described above, according to those aspects of the present invention, the service provider can provide a desired service to customers in a shop, a service providing place, or the like.

BRIEF DESCRIPTION OF THE DRAWINGS

In the accompanying drawings:

FIG. 3 is a block diagram illustrating a configuration example of functions implemented in the server executing programs;

FIG. 4 is a table showing an example of data stored in an action DB;

FIG. 5 is a table showing an example of data stored in a user group DB;

FIG. 13 is a table showing an example of data stored in an action DB;

FIG. 14 is a table showing an example of data stored in a tag group DB;

FIG. 17 is a table showing another example of data stored in the action DB; and

BEST MODE FOR CARRYING OUT THE INVENTION

Figure 1:
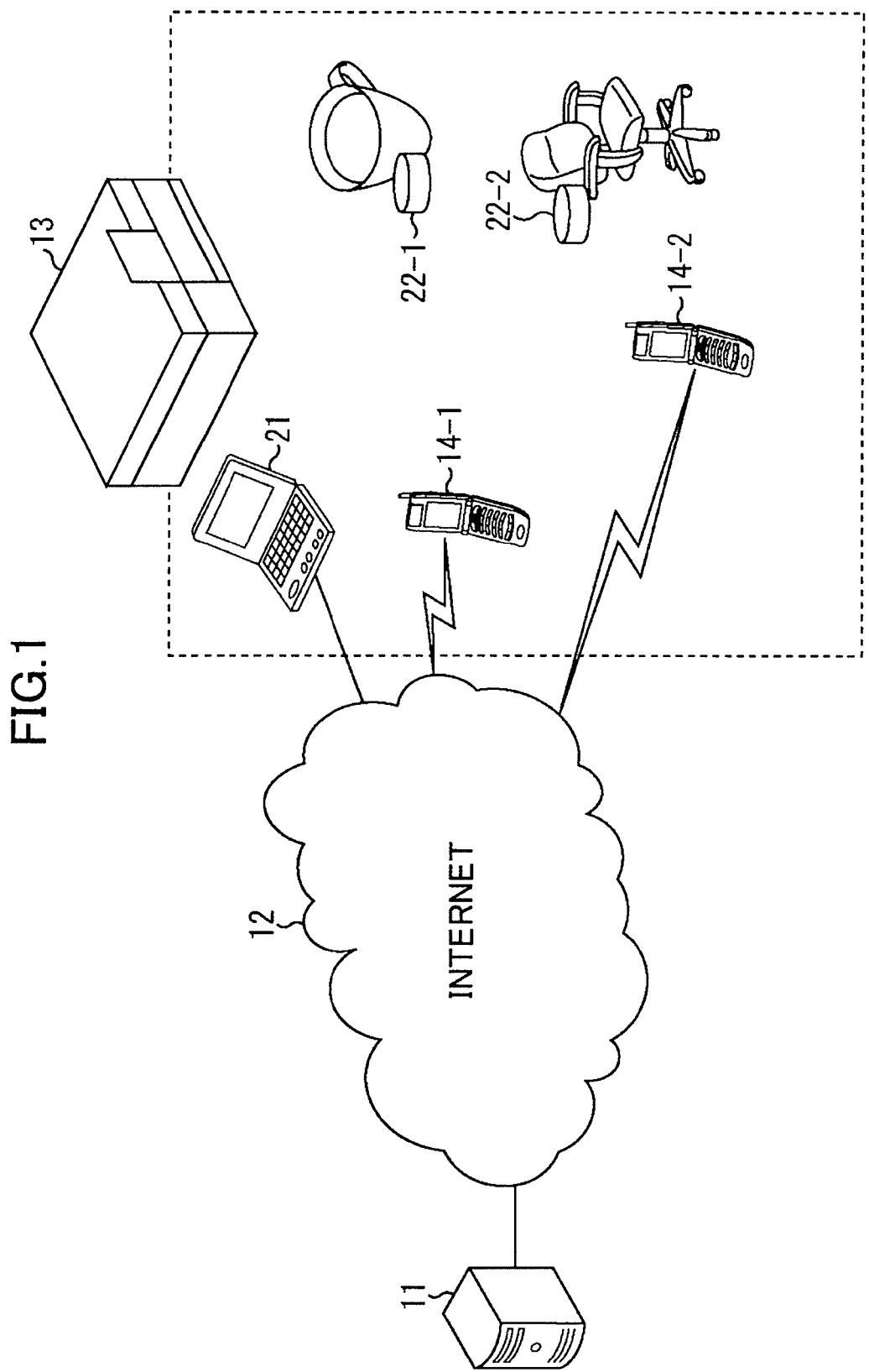
FIG. 1 is a diagram illustrating a service providing system.

Hereinbelow, description is given of an embodiment of the present invention, and the following exemplify correspondence relation between constituent features of the present invention and the embodiment described in the detailed description of the invention. This description is made by way of confirmation that an embodiment that supports the present invention is described in the detailed description of the invention. Accordingly, even if there is found another embodiment that is described in the detailed description of the invention but is not described herein as the embodiment corresponding to the constituent features of the present invention, this does not mean that the another embodiment does not correspond to the constituent features. Conversely, even if an embodiment is described as corresponding to the constituent features, this does not mean that the embodiment does not correspond to other constituent features than the constituent features described herein.

Firstly, an information providing device according to one aspect of the present invention includes: first storage control means for controlling storing a terminal device identification number for specifying a terminal device of a user belonging to a user group and an end timing of a valid period of the user group (for example, user group DB 70 of FIG. 3); second storage control means for controlling storing an individual identification number for identifying an ID tag of non-contact type which is set up by a service provider and an action associated with the individual identification number (for example, action DB 69 of FIG. 3); reception control means for controlling reception of a request for registration of the user group, which is transmitted along with the terminal device identification number from the terminal device, and controlling reception of the terminal device identification number and the individual identification number, which are transmitted from the terminal device which has read the ID tag (for example; web server function 61 of FIG. 3); and execution means for executing, if a current time point is not past the end timing of the user group when the terminal device identification number and the individual identification number are received, an action of providing a service of the service provider to the terminal device of the user belonging to the user group, which is identified by the terminal device identification number, the action being stored in association with the individual identification number (for example, service providing section 67 of FIG. 3).

Secondly, the information providing device according to one aspect of the present invention further includes third storage control means for controlling storing a count for each user group, which indicates a number of times the individual identification number has been received (for example, history DB 71 of FIG. 3). The execution means may cause the count for the each user group, which indicates the number of times the individual identification number has been received, to be stored, and may execute the action associated with the count for the each user group, which indicates the number of times the individual identification number has been received.

Figure 10:
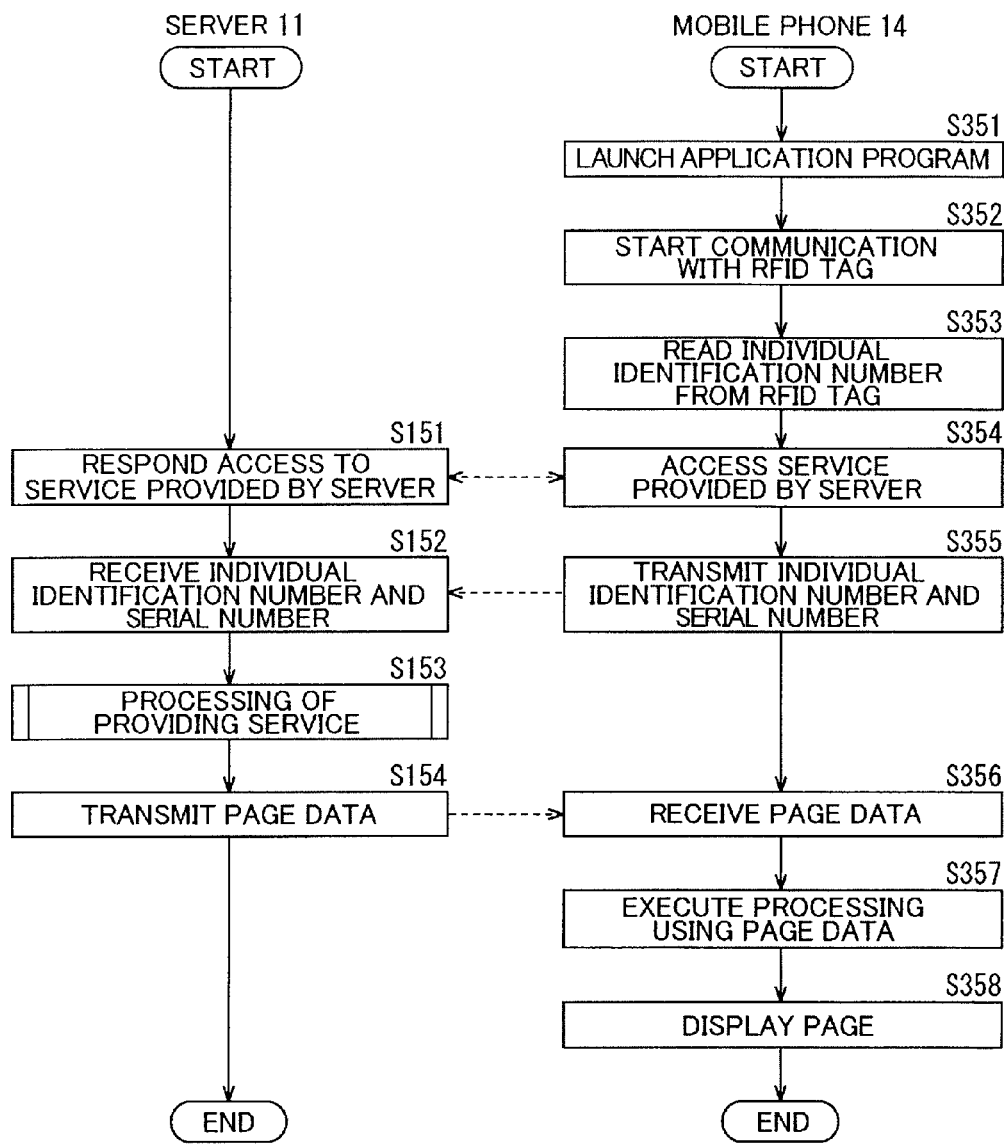
FIG. 10 is a flow chart illustrating processing of searching for an RFID tag.
Figure 11:
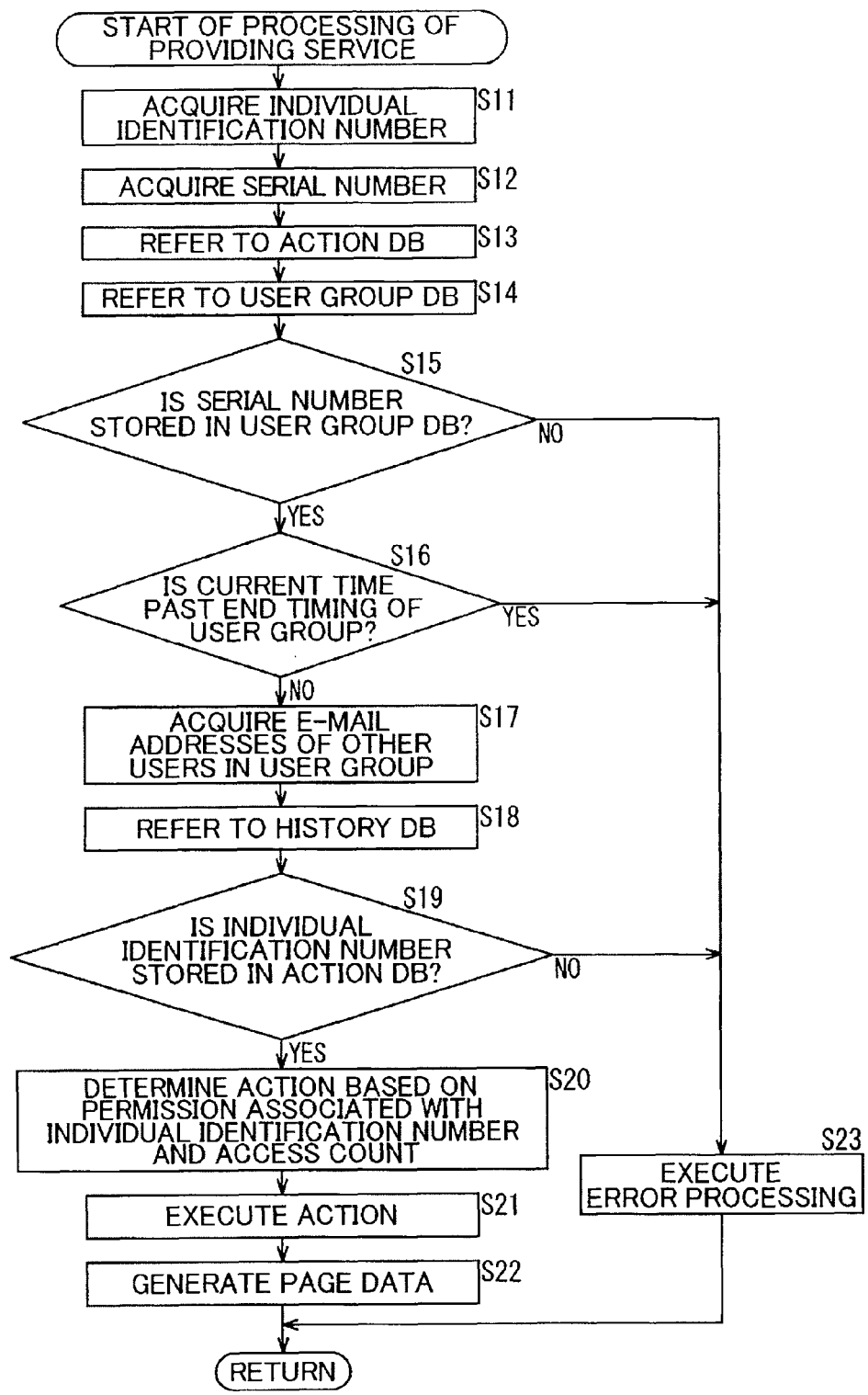
FIG. 11 is a flow chart illustrating a detailed example of processing of providing a service.

An information providing method or information providing processing that a computer is controlled to perform by a program according to one aspect of the present invention includes: controlling storing a terminal device identification number for specifying a terminal device of a user belonging to a user group and an end timing of a valid period of the user group (for example, processing of Step S134 of FIG. 8); controlling storage relation between an individual identification number for identifying an ID tag of non-contact type which is set up by a service provider and an action associated with the individual identification number (for example, processing of Step S108 of FIG. 6); controlling reception of a request for registration of the user group, which is transmitted along with the terminal device identification number from the terminal device, and controlling reception of the terminal device identification number and the individual identification number, which are transmitted from the terminal device which has read the ID tag (for example, processing of Step S133 of FIG. 8 and processing of Step S152 of FIG. 10); and executing, if a current time point is not past the end timing of the user group when the terminal device identification number and the individual identification number are received, an action of providing a service of the service provider to the terminal device of the user belonging to the user group, which is identified by the terminal device identification number, the action being stored in association with the individual identification number (for example, processing of Step S21 of FIG. 11).

FIG. 1 is a diagram illustrating a service providing system. A server 11 is managed by a service provider, and provides various kinds of services via Internet 12. The server 11 is connected via the Internet 12 to a personal computer 21 installed in a shop 13. The personal computer 21 accesses the server 11 via the Internet 12, to thereby set and change services to be provided from the server 11.

The following embodiment takes as an example a case in which ID tags of non-contact type are attached to equipment in a shop. However, the ID tag of non-contact type may be set up so as to be placed under a tablecloth, or may be attached to objects outside the shop, such as a road sign and a signboard. The shop represents one aspect of the service provider, whereas "to attach an ID tag" represents one aspect of "to set up an ID tag".

An RFID tag 22-1 and an RFID tag 22-2, which are ID tags of non-contact type, are attached to equipment in the shop 13, such as a coffee cup or a saucer, a chair, a table, and a tablecloth. For example, FeliCa (registered trademark) may be employed for the RFID tag 22-1 and the RFID tag 22-2. The RFID tag 22-1 and the RFID tag 22-2 may be the passive type or the active type, may be the long range type, the proximity type, the vicinity type, or the close coupled type, and may be the electromagnetic coupling type, the electromagnetic induction type, or the microwave type. Owing to the use of the RFID tag 22-1 and the RFID tag 22-2, which are ID tags of non-contact type, there is no need to provide a new power line unlike other electronic equipment.

A mobile phone 14-1 and a mobile phone 14-2 are operated by respective users, who are customers of the shop 13. The mobile phone 14-1 and the mobile phone 14-2 each have a reader function of reading the RFID tag 22-1 and the RFID tag 22-2. It should be noted that the mobile phone 14-1 and the mobile phone 14-2 may be provided with a writer function of writing data into the RFID tag 22-1 and the RFID tag 22-2.

Further, a user who operates the mobile phone 14-1 or the mobile phone 14-2 constitutes a user group, which is a group of a plurality of users, such as friends, a married couple, a family, and colleagues. In other words, the mobile phone 14-1 and the mobile phone 14-2 are one example of terminal devices of users belonging to a user group.

The personal computer 21 accesses the server 11 via the Internet 12, to thereby set an action as a service of the shop, which is to be provided in a case where the RFID tag 22-1 or the RFID tag 22-2 has been read. As described later, the personal computer 21 is also used to change an action after the action has been set.

The mobile phone 14-1 or the mobile phone 14-2 requests registration of a user group to the server 11 (to predetermined address) via the Internet 12.

When the mobile phone 14-1 or the mobile phone 14-2 has read, from the RFID tag 22-1 or the RFID tag 22-2, an individual identification number for identifying each of the RFID tag 22-1 and the REID tag 22-2, the mobile phone 14-1 or the mobile phone 14-2 transmits the individual identification number to the server 11 (to predetermined address) via the Internet 12. For example, in the case of employing FeliCa (registered trademark) for the RFID tag 22-1 and the RFID tag 22-2, the individual identification number may use IDm. The individual identification number only needs to allow identifying each of the RFID tag 22-1 and the RFID tag 22-2, and thus may be any ID or the like, which is set arbitrarily and uniquely.

When the individual identification number is transmitted from the mobile phone 14-1 or the mobile phone 14-2, the server 11 executes an action as a service of the shop, which has been set by the personal computer 21, with respect to the user group.

It should be noted that each of the mobile phone 14-1 and the mobile phone 14-2 downloads an application program in advance from the server 11 via the Internet 12 before reading the RFID tag 22-1 or the RFID tag 22-2.

Hereinbelow, when there is no need to discriminate between the mobile phone 14-1 and the mobile phone 14-2, the mobile phone 14-1 and the mobile phone 14-2 are simply referred to as mobile phone 14. Further, hereinbelow, when there is no need to discriminate between the RFID tag 22-1 and the RFID tag 22-2, the RFID tag 22-1 and the RFID tag 22-2 are simply referred to as RFID tag 22.

Figure 2:
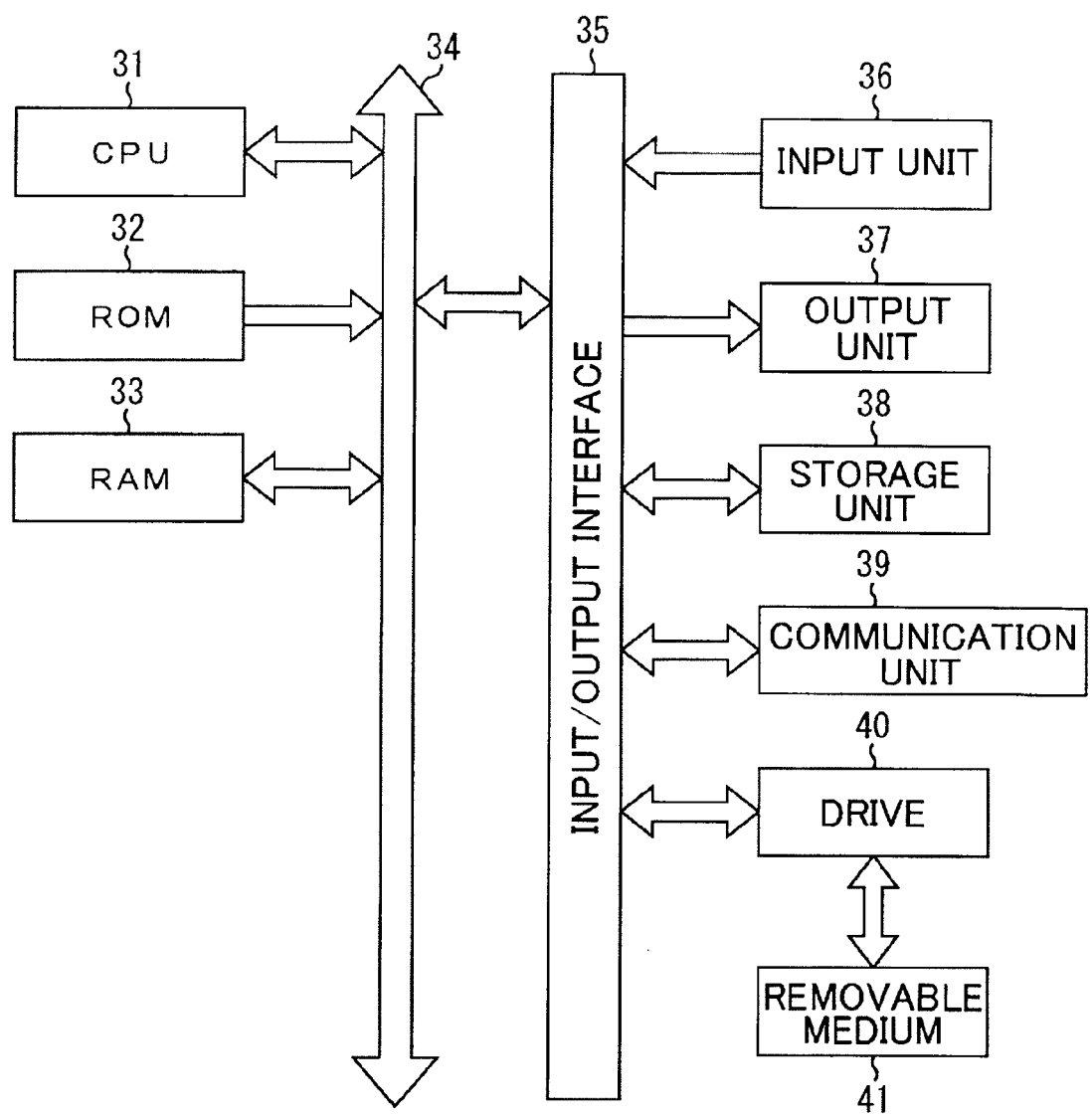
FIG. 2 is a block diagram illustrating a configuration example of hardware of a server.

FIG. 2 is a block diagram illustrating a configuration example of hardware of the server 11.

In the server 11, a central processing unit (CPU) 31, a read only memory (ROM) 32, and a random access memory (RAM) 33 are connected to one another via a bus 34.

The bus 34 is further connected to an input/output interface 35. The input/output interface 35 is connected to an input unit 36, an output unit 37, a storage unit 38, a communication unit 39, and a drive 40. The input unit 36 includes a keyboard, a mouse, a microphone, and the like. The output unit 37 includes a display, a speaker, and the like. The storage unit 38 includes a hard disc, a nonvolatile memory, and the like. The communication unit 39 includes a network interface and the like. The drive 40 drives a removable medium 41 such as a magnetic disc, an optical disc, a magneto-optical disc, or a semiconductor memory.

In the computer thus configured, for example, the CPU 31 loads programs stored in the storage unit 38 into the RAM 33 via the input/output interface 35 and the bus 34, and then executes the programs, to thereby perform a series of processing steps described later.

For example, the programs executed by the server 11 (CPU 31) are provided in a recorded form on the removable medium 41, which is a packaged medium formed of a magnetic disc (including a flexible disc), an optical disc (such as a compact disc-read only memory (CD-ROM), a digital versatile disc (DVD), etc.), a magneto-optical disc, a semiconductor disc, or the like. Alternatively, the programs are provided via a wired or wireless transmission medium, such as a local area network, the Internet 12, or digital satellite broadcasting.

The programs may be installed onto the computer by inserting the removable medium 41 into the drive 40 and storing the programs in the storage unit 38 via the input/output interface 35. Alternatively, the programs may be installed onto the computer by receiving the programs with the communication unit 39 via the wired or wireless transmission medium, and storing the programs in the storage unit 38. Further, the programs may be preinstalled onto the computer by storing the programs in the ROM 32 or the storage unit 38 in advance.

FIG. 3 is a block diagram illustrating a configuration example of functions implemented in the server 11 executing the programs. Specifically, when the server 11 executes the programs, there are implemented a web server function 61, a page data generation section 62, an individual identification number registration processing section 63, an action setting section 64, a user group registration processing section 65, an e-mail transmission processing section 66, a service providing section 67, an application database (DB) 68 (hereinbelow, referred to as application DB 68), an action database (DB) 69 (hereinbelow, referred to as action DB 69), a user group database (DB) 70 (hereinbelow, referred to as user group DB 70), and a history database (DB) 71 (hereinbelow, referred to as history DB 71).

It should be noted that each of the application DB 68, the action DB 69, the user group DB 70, and the history DB 71 may be a database that is directly built on a file system provided by an operating system, or may be a database that is built with the use of a database management system. Further, some databases may be combined among the application DB 68, the action DB 69, the user group DB 70, and the history DB 71, to thereby configure one database.

The web server function 61 is implemented by, for example, executing a so-called web server program, such as Apache HTTP Server. According to the procedures defined in the hypertext transfer protocol (HTTP), the web server function 61 provides webpage data employing the hypertext markup language (HTML) method, the extensible markup language (XML) method, or the like, which contains various kinds of objects, such as text and images. The page data generation section 62 generates webpage data that is to be provided by the web server function 61.

The individual identification number registration processing section 63 accepts a request for registration of the individual identification number of the RFID tag 22, and causes the action DB 69 to store the individual identification number. The action setting section 64 accepts setting of an action associated with the individual identification number, and causes the action DB 69 to store the action in association with the individual identification number.

The user group registration processing section 65 accepts a request for registration of the user group, and causes the user group DB 70 to store a serial number for specifying the mobile phone 14 of the user belonging to the user group, and a start timing and an end timing of a valid period of the user group. The serial number is one example of a terminal device identification number for specifying a terminal device of a user. The e-mail transmission processing section 66 performs processing of transmitting e-mail to the mobile phone 14 of the user belonging to the user group.

In a case where the service providing section 67 has received an individual identification number, the service providing section 67 executes an action associated with the individual identification number. The service providing section 67 includes an action condition acquisition section 81, a registration judgment section 82, an action determination section 83, and an action execution section 84.

The action condition acquisition section 81 acquires conditions for executing an action from the action DB 69, the user group DB 70, and the history DB 71. The registration judgment section 82 judges whether or not the received individual identification number is stored in the action DB 69. Based on the individual identification number, an access count of the user group, and the like, the action determination section 83 determines an action that is to be executed. The action execution section 84 executes the determined action.

The application DB 68 stores an application program to be downloaded onto the mobile phone 14, and a program necessary for executing an action. The action DB 69 stores the individual identification number for identifying the RFID tag 22 and the action associated with the individual identification number in association with each other.

FIG. 4 is a table showing an example of data stored in the action DB 69. The action DB 69 stores the individual identification number for specifying the RFID tag 22, a shop ID for specifying the shop 13, permissions, flags, and an action to serve as an service of the shop 13. The permission indicates a condition item for permitting the execution of an action. The flag indicates a condition corresponding to the permission. Specifically, as the action, there is stored an ID for specifying processing, a program ID for specifying a program for executing the processing, or the like.

In the example illustrated in FIG. 4, the action DB 69 stores: as a first permission, a condition regarding whether or not the access count of the user group is 0; as a first flag associated with the first permission, a flag indicating whether or not the access count of the user group is 0; as a second permission, a condition regarding whether or not it is during a campaign period; as a second flag associated with the second permission, a flag indicating whether or not it is during a campaign period; as a third permission, a statement for generating a random number and setting a value obtained by multiplying the random number by 1.2 in a variable A; and as a third flag associated with the third permission, a flag indicating whether or not the variable A is equal to or larger than 1.

Specifically, the action DB 69 stores an action of distributing an advertisement about the shop campaign to the user group, in association with an individual identification number "AAA100001" and a shop ID "S555777".

Further, the action DB 69 stores an action of distributing a coupon to the user group as well as setting the access count of the user group in the history DB 71, in association with: an individual identification number "AAA100002"; the shop ID "S555777"; the first flag, which is associated with the first permission regarding whether or not the access count of the user group is 0, indicating "1", which means that the access count of the user group is 0; the second flag, which is associated with the second permission regarding whether or not it is during a campaign period, indicating "1", which means that it is during a campaign period; and the third flag, which is associated with the third permission requesting generating a random number and setting a value obtained by multiplying the random number by 1.2 in a variable A, indicating that the variable A is equal to or larger than 1.

The action DB 69 stores an action of distributing a lost-lottery page to the user group as well as setting the access count of the user group in the history DB 71, in association with: the individual identification number "AAA100002"; the shop ID "S555777"; the first flag, which is associated with the first permission regarding whether or not the access count of the user group is 0, indicating "1", which means that the access count of the user group is 0; the second flag, which is associated with the second permission regarding whether or not it is during a campaign period, indicating "1", which means that it is during a campaign period; and the third flag, which is associated with the third permission requesting generating a random number and setting a value obtained by multiplying the random number by 1.2 in a variable A, indicating that the variable A is less than 1.

Further, the action DB 69 stores an action of distributing a page indicating that a coupon distribution period has expired to the user group, in association with: the individual identification number "AAA100002"; the shop ID "S555777"; the first flag, which is associated with the first permission regarding whether or not the access count of the user group is 0, indicating "1", which means that the access count of the user group is 0; and the second flag, which is associated with the second permission regarding whether or not it is during a campaign period, indicating "0", which means that it is not during a campaign period.

Further, the action DB 69 stores an action of distributing a page indicating confirmation of user's participation to the user group, in association with: the individual identification number "AAA100002"; the shop ID "S555777"; the first flag, which is associated with the first permission regarding whether or not the access count of the user group is 0, indicating "0", which means that the access count is not 0.

Further, the action DB 69 stores an action of distributing a point-get URL to the user group as well as setting the access count of the user group in the history DB 71, in association with: an individual identification number "AAA100003"; the shop ID "S555777"; the first flag, which is associated with the first permission regarding whether or not the access count of the user group is 0, indicating "1", which means that the access count of the user group is 0; and the second flag, which is associated with the second permission regarding whether or not it is during a campaign period, indicating "1", which means that it is during a campaign period. The action DB 69 stores an action of distributing a page indicating the campaign is finished to the user group as well as setting the access count of the user group in the history DB 71, in association with: the individual identification number "AAA100003"; the shop ID "S555777"; the first flag, which is associated with the first permission regarding whether or not the access count of the user group is 0, indicating "1", which means that the access count of the user group is 0; and the second flag, which is associated with the second permission regarding whether or not it is during a campaign period, indicating "0", which means that it is not during a campaign period.

Further, the action DB 69 stores an action of distributing an advertisement to the user group, in association with: the individual identification number "AAA100003"; the shop ID "S555777"; and the first flag, which is associated with the first permission regarding whether or not the access count of the user group is 0, indicating "0", which means that the access count of the user group is not 0.

It should be noted that the permissions are not limited to the conditions regarding the access count of the user group and the periods such as the campaign period. Other conditions may also be used, such as a condition regarding whether or not the user is a member of the service provider, a condition regarding whether or not the user is located in the shop 13, a serial number for specifying the mobile phone 14, a date, and a time point.

Referring back to FIG. 3, the user group DB 70 stores a serial number and an end timing of a valid period of the user group.

FIG. 5 is a table showing an example of data stored in the user group DB 70. The user group DB 70 stores: a user group identification number for identifying (specifying) the user group; a user count indicating the count of the users belonging to the group; a serial number for specifying the mobile phone 14 of the user belonging to the user group; an e-mail address of the user belonging to the user group; and a start timing and an end timing of the user group. The start timing of the user group indicates a date and time when the valid period of the user group starts, and the end timing of the user group indicates a date and time when the valid period of the user group ends.

In the example illustrated in FIG. 5, the user group DB 70 stores: a user group identification number "UGAA100001"; a user count "2"; serial numbers "BBB100001" and "BBB100002"; e-mail addresses "CCC1001@ddd" and "CCC1002@ddd"; a start timing "200901011045" indicating "10:45, Jan. 1, 2009"; and an end timing "200901011245" indicating "12:45, Jan. 1, 2009". Further, the user group DB 70 stores: a user group identification number "UGAA100002"; a user count "4"; serial numbers "BBB100003", "BBB100005", "BBB100006", and "BBB100007"; e-mail addresses "CCC1003@ddd", "CCC1005@ddd", "CCC1006@ddd", and "CCC1007@ddd"; a start timing "200901021230" indicating "12:30, Jan. 2, 2009"; and an end timing "200901021430" indicating "14:30, Jan. 2, 2009".

Still further, the user group DB 70 stores: a user group identification number "UGAA100003"; a user count "2"; serial numbers "BBB100004" and "BBB100008"; e-mail addresses "CCC1004@ddd" and "CCC1008@ddd"; a start timing "200902032315" indicating "23:15, Feb. 3, 2009"; and an end timing "200902040115" indicating "1:15, Feb. 4, 2009".

Referring back to FIG. 3 again, the history DB 71 stores a history of, for example, an access count of the user group.

Figure 6:
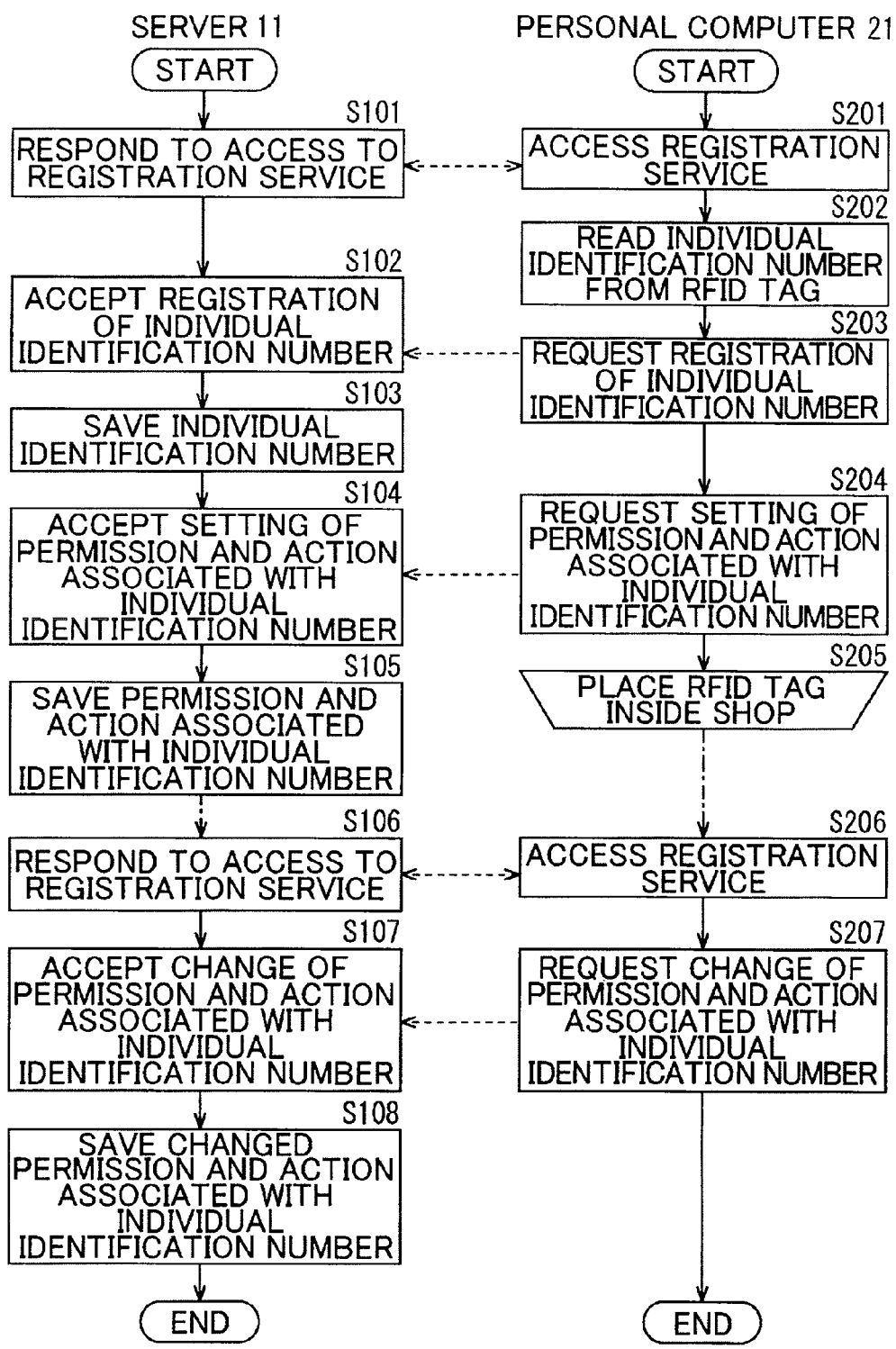
FIG. 6 is a flow chart illustrating an example of registration processing.

Next, an example of registration processing is described with reference to a flow chart of FIG. 6. In Step S201, the personal computer 21 accesses a registration service of the server 11 via the Internet 12. In Step S101, the web server function 61 responds to the access to the registration service, which is made by the personal computer 21. In Step S202, the personal computer 21 reads an individual identification number from the RFID tag 22 with the use of a reader connected thereto or incorporated therein. In Step S203, the personal computer 21 transmits the individual identification number to the server 11 via the Internet 12, and requests registration of the individual identification number. In Step S102, the individual identification number registration processing section 63 uses the communication unit 39 to receive the individual identification number, and accepts the registration of the individual identification number transmitted from the personal computer 21. In Step S103, the individual identification number registration processing section 63 supplies, to the action DB 69, the individual identification number accepted for the registration, and the action DB 69 saves (stores) the individual identification number.

In Step S204, the personal computer 21 transmits, via the Internet 12, a shop ID, the individual identification number, a permission, a flag, and an action, and requests setting of the permission and the action associated with the individual identification number. In Step S104, the action setting section 64 uses the communication unit 39 to receive the shop ID, the individual identification number, the permission, the flag, and the action, which are transmitted from the personal computer 21, and accepts the setting of the permission and the action associated with the individual identification number. In Step S105, the action setting section 64 saves the permission and the action associated with the individual identification number, which are accepted for the setting. In other words, the action setting section 64 supplies, to the action DB 69, the shop ID, the individual identification number, the permission, the flag, and the action. The action DB 69 saves (stores) the shop ID, the individual identification number, the permission, the flag, and the action in association with one another.

In Step S205, a person in charge of the shop 13 places the RFID tag 22 inside the shop 13. In this case, the person in charge attaches the RFID tag 22 to the equipment of the shop 13 so that the RFID tag 22 is not easily recognized from outside (so that the RFID tag 22 is hidden).

Ina case of changing the action associated with the individual identification number, in Step S206, the personal computer 21 accesses the registration service of the server 11 via the Internet 12. In Step S106, the web server function 61 responds to the access to the registration service, which is made by the personal computer 21. In Step S207, the personal computer 21 transmits, via the Internet 12, a changed permission, a changed flag, or a changed action along with the shop ID and the individual identification number, and requests the change of the permission and the action associated with the individual identification number. In Step S107, the action setting section 64 uses the communication unit 39 to receive the shop ID and the individual identification number, which are transmitted from the personal computer 21, and to further receive the changed permission, the changed flag, or the changed action, and accepts the change of the permission and the action associated with the individual identification number. In Step S108, the action setting section 64 saves the changed permission and action associated with the individual identification number. In other words, the action setting section 64 supplies, to the action DB 69, the shop ID, the individual identification number, the changed permission, the changed flag, and the changed action. The action DB 69 saves the shop ID, the individual identification number, the changed permission, the changed flag, and the changed action in association with one another. Then, the registration processing is ended.

As described above, the individual identification number and the action are associated with each other. Associating the individual identification number with the action may be performed with ease on the personal computer 21.

Further, in the case of the registration, the server 11 may first read the individual identification number from the RFID tag 22, and then set the permission and the action.

Figure 7:
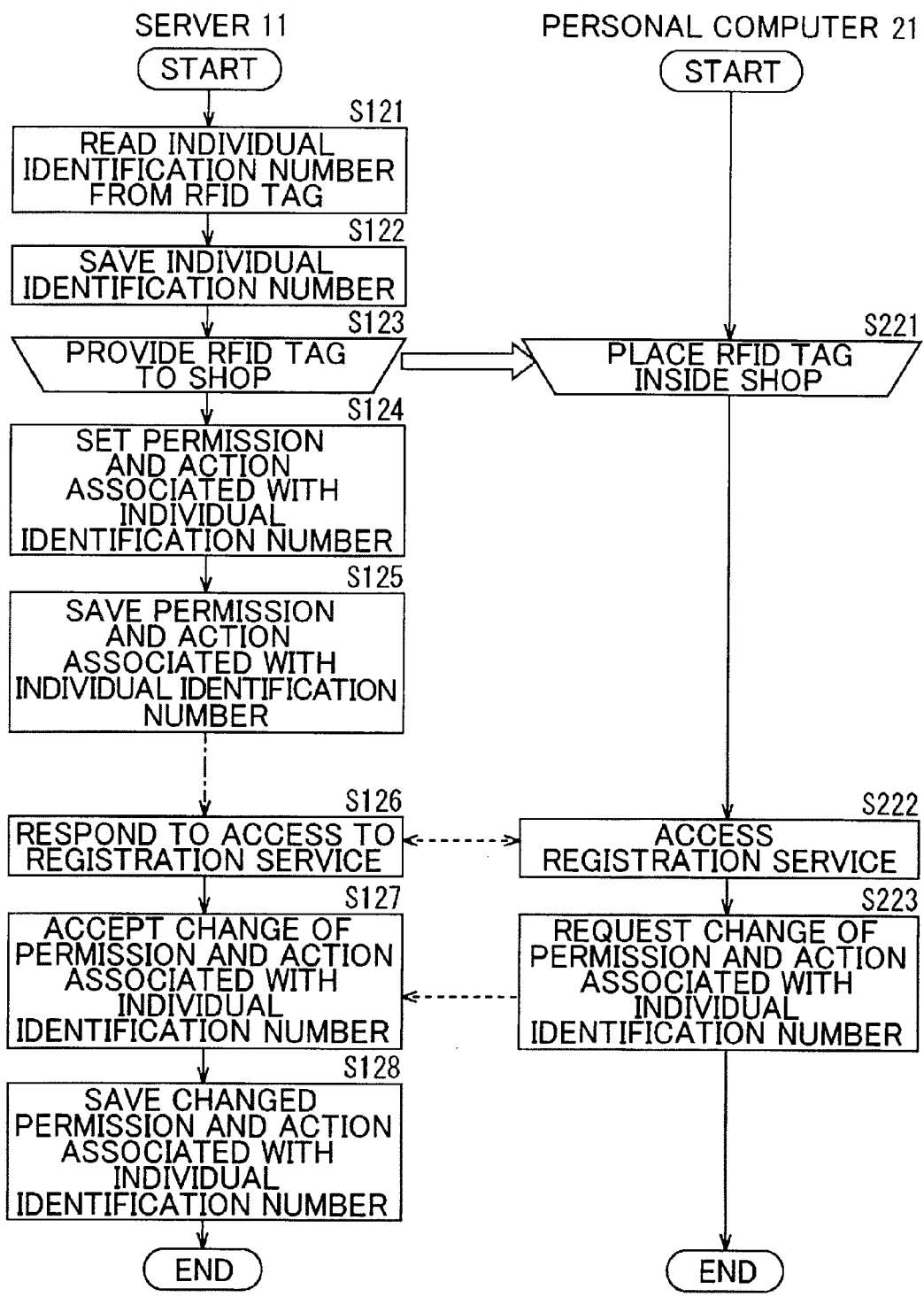
FIG. 7 is a flow chart illustrating another example of the registration processing.

FIG. 7 is a flow chart illustrating another example of the registration processing. In Step S121, the individual identification number registration processing section 63 reads an individual identification number from the RFID tag 22 with the use of the reader connected thereto or incorporated therein. In Step S122, the individual identification number registration processing section 63 supplies, to the action DB 69, the individual identification number accepted for the registration, and the action DB 69 saves the individual identification number. A person in charge of the service provider provides the RFID tag 22 to the shop 13. In Step S221, the person in charge of the shop 13 places the RFID tag 22 inside the shop 13. In other words, the person in charge attaches the RFID tag 22 to the equipment of the shop 13 in the same manner as in Step S205.

In Step S124, the action setting section 64 acquires a shop ID, the individual identification number, a permission, a flag, and an action, which are input in response to operation performed to the input unit 36 by the person in charge, and sets the permission and the action associated with the individual identification number. In Step S125, the action setting section 64 saves the permission and the action associated with the individual identification number. In other words, the action setting section 64 supplies, to the action DB 69, the shop ID, the individual identification number, the permission, the flag, and the action. The action DB 69 saves (stores) the shop ID, the individual identification number, the permission, the flag, and the action in association with one another.

Step S222, Step S223, Step S126, Step S127, and Step S128 are the same as Step S206, Step S207, Step S106, Step S107, and Step S108, respectively, and description thereof is therefore omitted herein.

In this manner, in the case of setting the individual identification number and the action on the server 11 side, the number of tasks required in the shop 13 may be reduced.

As described above, the action DB 69 stores the shop ID, the individual identification number, the permission, the flag, and the action in association with one another.

Next, processing of registering a user group is described. First, referring to a flow chart of FIG. 8, description is given of processing of generating a user group, which is executed between the server 11 and the mobile phone 14 of the first user among users who are to belong to the user group.

In Step S331, the mobile phone 14 executes an application program downloaded in advance from the server 11. In Step S332, the mobile phone 14 accesses a user group registration service of the server 11 via the Internet 12. In Step S131, the user group registration processing section 65 responds to the access to the user group registration service, which is made by the mobile phone 14. In Step S132, the user group registration processing section 65 uses the page data generation section 62 to generate data of a user group registration page, and further uses the web server function 61 that controls the communication unit 39 to transmit, via the Internet 12 to the mobile phone 14, the generated data of the user group registration page. In Step S333, the mobile phone 14 receives the data of the user group registration page transmitted from the server 11. In Step S334, the mobile phone 14 displays the user group registration page.

In Step S335, the mobile phone 14 acquires a serial number stored inside the mobile phone 14 itself. In Step S336, the mobile phone 14 acquires, in response to user's operation to an input unit (not shown) constituted by a button, a dial, a touch panel, and other such component, a count of users in a user group, which is to be newly generated, and e-mail addresses of the users in the user group. For example, the count of users in the user group is acquired based on data that is input in response to the user's operation to the input unit. For example, the e-mail addresses of the users in the user group are acquired by reading data of an address book stored in an internal memory.

In Step S337, the mobile phone 14 transmits, via the Internet 12 to the server 11, the serial number of its own, the count of users in the user group, and the e-mail addresses of the users in the user group. In Step S133, the user group registration processing section 65 uses the web server function 61 that controls the communication unit 39 to receive the serial number of the mobile phone 14, the count of users in the user group, and the e-mail addresses of the users in the user group, which are transmitted from the mobile phone 14 via the Internet 12.

In Step S134, the user group registration processing section 65 acquires a current time point based on a real-time clock (not shown), and sets the acquired current time point as the start timing of the valid period of the user group. Further, the user group registration processing section 65 adds, to the current time point, a predetermined period of time, for example, two hours, and sets the time point thus obtained as the end timing of the valid period of the user group. The user group registration processing section 65 then stores, in the user group DB 70, as information on the new user group, the count of users in the user group, the serial number of the mobile phone 14 of the first user, the e-mail addresses of the users in the user group, the start timing, and the end timing.

In Step S135, the user group registration processing section 65 uses the e-mail transmission processing section 66 that controls the communication unit 39 to transmit e-mail for notifying other users in the user group (users excluding the first user from the users in the user group) of an address of the user group registration page. It should be noted that the e-mail for the notification of the address of the user group registration page has a user group identification number for identifying the new user group written therein.

In Step S136, the user group registration processing section 65 uses the page data generation section 62 to generate data of a page indicating that the user group has been generated, and further uses the web server function 61 that controls the communication unit 39 to transmit, via the Internet 12 to the mobile phone 14 of the first user, the data of the page indicating that the user group has been generated. In Step S338, the mobile phone 14 receives the data of the page indicating that the user group has been generated, which is transmitted from the server 11. In Step S339, the mobile phone 14 displays the page indicating that the user group has been generated. Then, the processing of generating a user group is ended.

In this manner, the user group is newly generated after the mobile phone 14 of the first user among the users who are to belong to the user group accesses the user group registration service.

Figure 9:
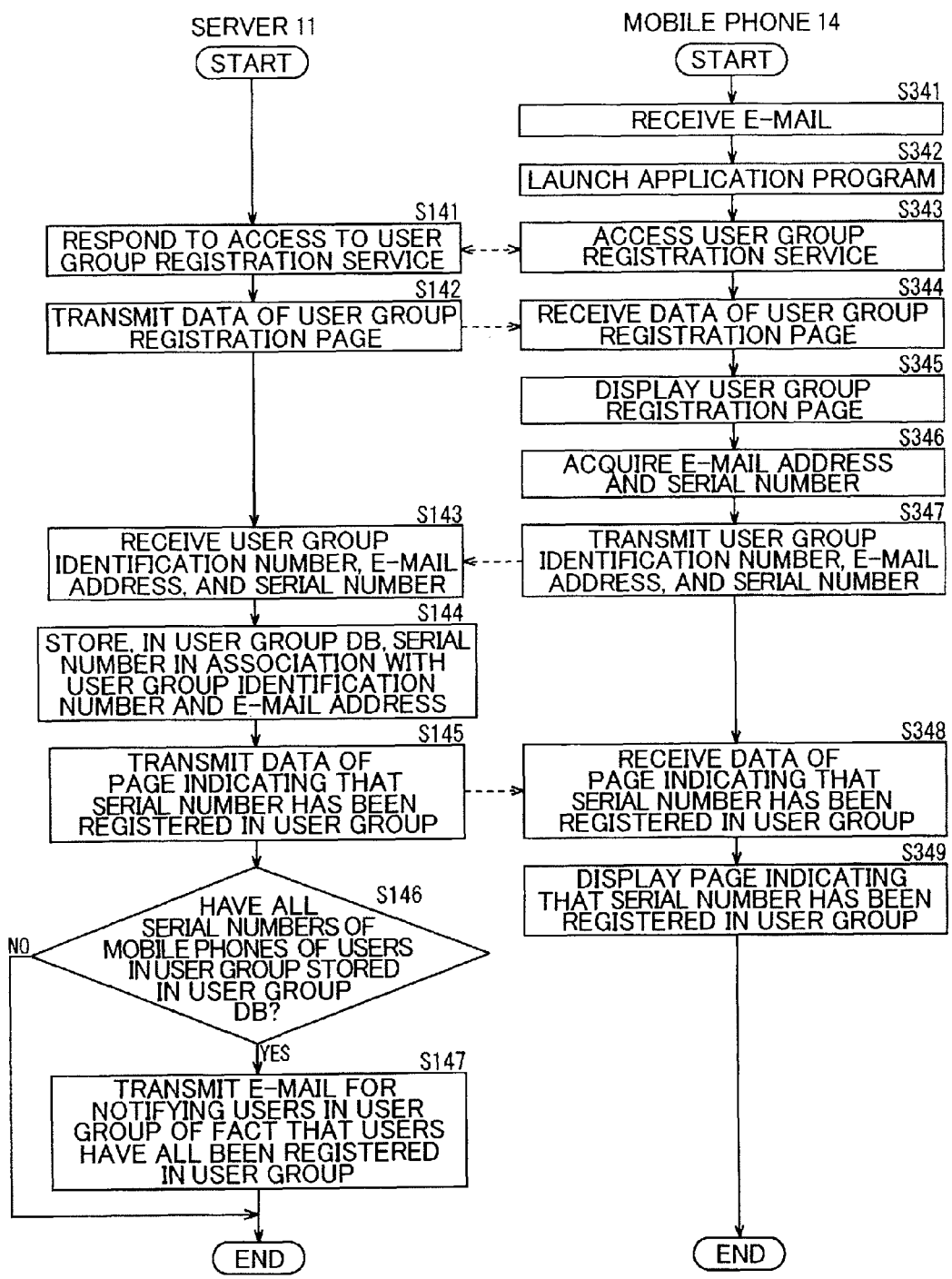
FIG. 9 is a flow chart illustrating processing of registering a serial number in the user group.

Next, referring to a flow chart of FIG. 9, description is given of processing of registering a serial number in the user group, which is executed between the server 11 and the mobile phone 14 of each of the other users in the user group (users excluding the first user from the users in the user group). In Step S341, the mobile phone 14 receives the e-mail for the notification of the address of the user group registration page, which is transmitted from the server 11.

In Step S342, the mobile phone 14 executes an application program downloaded in advance from the server 11. In Step S343, the mobile phone 14 refers to the address written in the e-mail received in the processing of Step S341, and accesses the user group registration service of the server 11 via the Internet 12. In Step S141, the user group registration processing section 65 responds to the access to the user group registration service, which is made by the mobile phone 14. In Step S142, the user group registration processing section 65 uses the page data generation section 62 to generate data of a user group registration page, and further uses the web server function 61 that controls the communication unit 39 to transmit, via the Internet 12 to the mobile phone 14, the generated data of the user group registration page. In Step S344, the mobile phone 14 receives the data of the user group registration page transmitted from the server 11. In Step S345, the mobile phone 14 displays the user group registration page.

In Step S346, the mobile phone 14 acquires an e-mail address of the user of the mobile phone 14 and a serial number of the mobile phone 14, which are stored inside the mobile phone 14 itself.

In Step S347, the mobile phone 14 transmits, via the Internet 12 to the server 11, the user group identification number written in the e-mail received in the processing of Step S341, the e-mail address of the user of the mobile phone 14, and the serial number of the mobile phone 14. In Step S143, the user group registration processing section 65 uses the web server function 61 that controls the communication unit 39 to receive the user group identification number, the e-mail address, and the serial number, which are transmitted from the mobile phone 14 via the Internet 12.

In Step S144, the user group registration processing section 65 stores, in the user group DB 70, the serial number of the mobile phone 14 that is accessing the user group registration page in association with the user group identification number and the e-mail address.

In Step S145, the user group registration processing section 65 uses the page data generation section 62 to generate data of a page indicating that the serial number has been registered in the user group, and further uses the web server function 61 that controls the communication unit 39 to transmit, via the Internet 12 to the mobile phone 14 that is accessing the user group registration page, the data of the page indicating that the serial number has been registered in the user group. In Step S348, the mobile phone 14 receives the data of the page indicating that the serial number has been registered in the user group, which is transmitted from the server 11. In Step S349, the mobile phone 14 displays the page indicating that the serial number has been registered in the user group.

In Step S146, the user group registration processing section 65 judges whether or not all the serial numbers of the mobile phones 14 of the users in the user group have been stored in the user group DB 70. If it is judged that all the serial numbers of the mobile phones 14 of the users in the user group have been stored in the user group DB 70, the procedure advances to Step S147, and the user group registration processing section 65 uses the e-mail transmission processing section 66 that controls the communication unit 39 to transmit e-mail for notifying all the users in the user group of the fact that the users have all been registered in the user group. Then, the processing of registering a serial number in the user group is ended.

In Step S146, if it is judged that not all the serial numbers of the mobile phones 14 of the users in the user group have been stored in the user group DB 70, the processing of Step S147 is skipped and the processing of registering a serial number in the user group is ended without the transmission of the e-mail.

In this manner, each of the mobile phones 14 of all the users belonging to the user group accesses the user group registration service, and all the serial numbers of the mobile phones 14 of the users in the user group are stored in the user group DB 70. After all the serial numbers in the user group have been registered, the users in the user group searches for the RFID tag 22 using their own mobile phones 14.

Next, processing of searching for the RFID tag 22 is described with reference to a flow chart of FIG. 10. In Step S351, the mobile phone 14 executes an application program downloaded in advance from the server 11. When the mobile phone 14 approaches the RFID tag 22 attached to the equipment of the shop 13, in Step S352, the mobile phone 14 starts communication with the RFID tag 22. In Step S353, the mobile phone 14 reads an individual identification number from the RFID tag 22. In Step S354, the mobile phone 14 accesses a service which is provided by the server 11 via the Internet 12. In Step S151, the service providing section 67 responds to the access to the service which is provided by the server 11, which is made by the mobile phone 14. In Step S355, the mobile phone 14 transmits the individual identification number and a serial number for specifying the mobile phone 14 to the server 11 via the Internet 12. In Step S152, the service providing section 67 uses the communication unit 39 to receive the individual identification number and the serial number, which are transmitted from the mobile phone 14.

In Step S153, processing of providing a service is executed. The processing of providing a service is described later in detail with reference to a flow chart of FIG. 11.

In Step S154, the service providing section 67 uses the web server function 61 that controls the communication unit 39 to transmit page data to the mobile phone 14 via the Internet 12. In Step S356, the mobile phone 14 receives the page data transmitted from the server 11. In Step S357, the mobile phone 14 executes processing based on the page data. In Step S358, the mobile phone 14 displays a page. Then, the processing of searching for the RFID tag 22 is ended.

Next, referring to the flow chart of FIG. 11, description is given of a detailed example of the processing of providing a service, which is to be performed in Step S153. In Step S11, the action condition acquisition section 81 acquires the individual identification number received in the processing of Step S152. In Step S12, the action condition acquisition section 81 acquires the serial number received in the processing of Step S152. In Step S13, the action condition acquisition section 81 refers to the action DB 69 to read, from the action DB 69, a permission, a flag, and an action associated with the acquired individual identification number. In Step S14, the action condition acquisition section 81 refers to the user group DB 70 to acquire, from the user group DB 70, a user group identification number associated with the acquired serial number, a serial number for specifying the mobile phone 14 of a user belonging to the user group, and an end timing of the valid period of the user group.

In Step S15, the registration judgment section 82 judges whether or not the serial number received in the processing of Step S152 is stored in the user group DB 70, and if it is judged that the serial number is stored in the user group DB 70, the procedure advances to Step S16. In Step S16, the registration judgment section 82 compares the current time point indicated by the real-time clock (not shown) with the end timing of the valid period of the user group, to thereby judge whether or not the current time point is past the end timing of the user group. If it is judged that the current time point is not past the end timing of the user group, the procedure advances to Step S17.

In Step S17, the action condition acquisition section 81 acquires e-mail addresses of the other users in the user group (users in the user group excluding the user of the mobile phone 14 that is accessing the server 11 in the processing of searching for the RFID tag 22 illustrated in FIG. 10) from the user group DB 70. In Step S18, the action condition acquisition section 81 refers to the history DB 71 to read an access count of the user group from the history DB 71.

In Step S19, the registration judgment section 82 judges whether or not the acquired individual identification number is stored in the action DB 69. If it is judged in Step S19 that the individual identification number is stored in the action DB 69, the procedure advances to Step S20, and the action determination section 83 determines an action based on the permission associated with the individual identification number and the access count of the user group. In Step S21, the action execution section 84 executes the determined action. For example, the action execution section 84 reads a program corresponding to the determined action from the application DB 68 and executes the program, to thereby execute the action. It should be noted that a coupon or a URL is distributed to the mobile phone 14 that is accessing the server 11 in the processing of searching for the RFID tag 22 illustrated in FIG. 10 by providing a page, while a coupon or a URL is distributed to the mobile phones 14 of the other users in the user group by using e-mail.

In Step S22, the page data generation section 62 generates page data corresponding to the executed action. Then, the processing of providing a service is ended. If it is judged in Step S19 that the individual identification number is not stored in the action DB 69, the procedure advances to Step S23, and the service providing section 67 executes error processing. Then, the processing of providing a service is ended.

If it is judged in Step S16 that the current time point is past the end timing of the user group, the procedure advances to Step S23, and the service providing section 67 executes the error processing. Then, the processing of providing a service is ended. Further, if it is judged in Step S15 that the serial number is not stored in the user group DB 70, the procedure advances to Step S23, and the service providing section 67 executes the error processing. Then, the processing of providing a service is ended.

In this manner, the shop 13 can provide a service to the group of customers (users) who use the mobile phones 14. The permission and the action associated with the individual identification number may be changed with ease on the side of the shop 13, and accordingly, in a shop which an indefinite number of customers (users) visit, the shop can provide a desired service to the group of customers according to situations.

Next, description is given of an example of providing an action as a service of the shop 13 by using the mobile phone 14 to read the RFID tags 22 attached to a plurality of equipments of the shop 13 and belonging to a group. The group including ID tags such as the RFID tags 22 is hereinbelow referred to as tag group.

Figure 12:
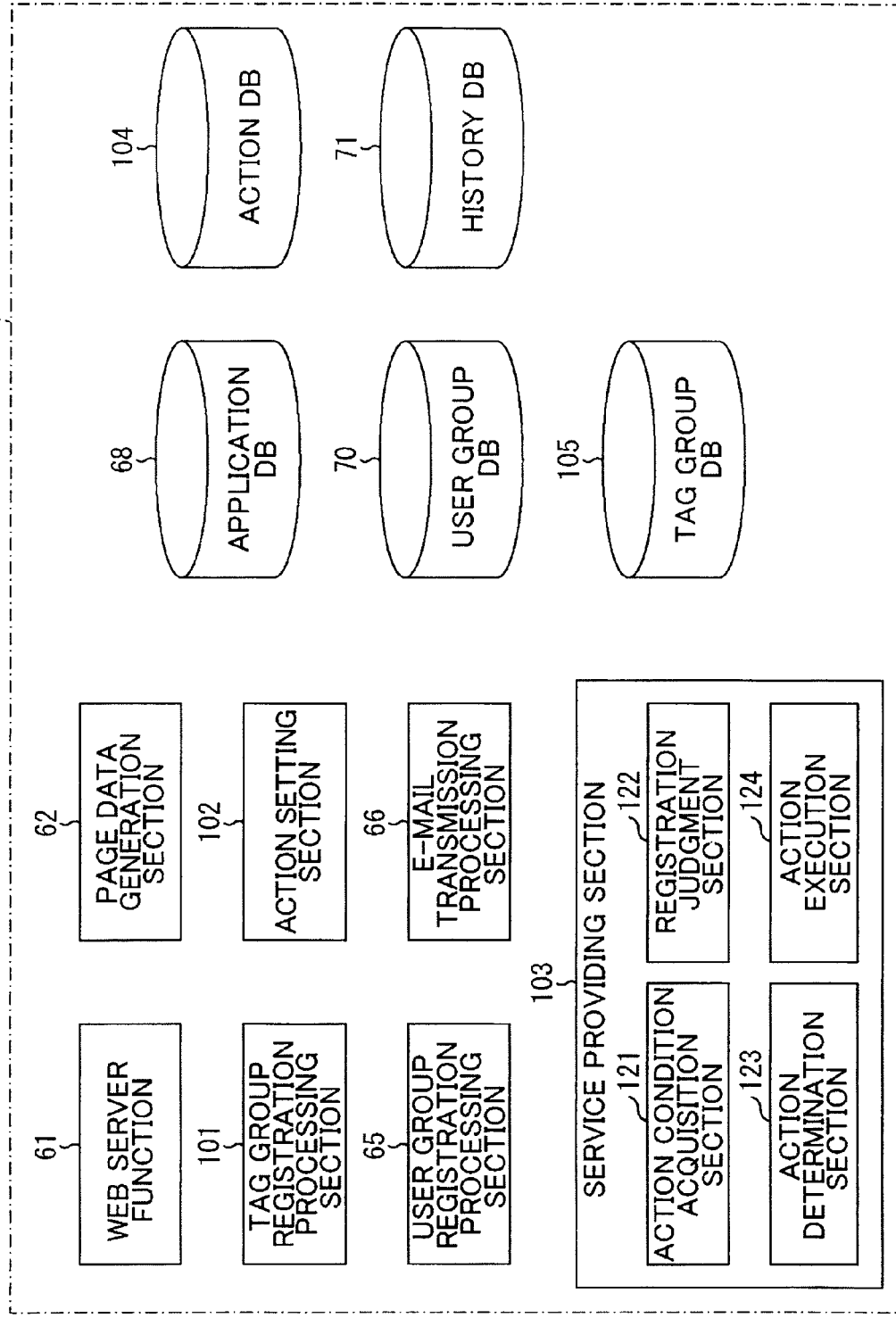
FIG. 12 is a block diagram illustrating another configuration example of functions implemented in the server executing programs.

FIG. 12 is a block diagram illustrating another configuration example of functions implemented in the server 11 executing the programs. Specifically, when the server 11 executes the programs, there are implemented the web server function 61, the page data generation section 62, a tag group registration processing section 101, an action setting section 102, the user group registration processing section 65, the e-mail transmission processing section 66, a service providing section 103, the application DB 68, an action database (DB) 104 (hereinbelow, referred to as action DB 104), the user group DB 70, the history DB 71, and a tag group database (DB) 105 (hereinbelow, referred to as tag group DB 105).

The web server function 61, the page data generation section 62, the user group registration processing section 65, the e-mail transmission processing section 66, the application DB 68, the user group DB 70, and the history DB 71 are the same as those illustrated in FIG. 3, and description thereof is therefore omitted herein.

The tag group registration processing section 101 accepts a request for registration of a tag group, and stores a tag group identification number for identifying the tag group in the action DB 104. The action setting section 102 accepts setting of an action associated with the tag group identification number, and stores the action in the action DB 104 in association with the tag group identification number. The service providing section 103 executes, when receiving an individual identification number of the RFID tag 22 belonging to the tag group, the action associated with the tag group identification number identifying the tag group.

The action DB 104 stores the tag group identification number for identifying the tag group and the action associated with the tag group identification number in association with each other.

FIG. 13 is a table showing an example of data stored in the action DB 104. The action DB 104 stores a tag group identification number for identifying the tag group, a shop ID for specifying the shop 13, permissions, flags, and an action as a service of the shop 13.

In the example illustrated in FIG. 13, the action DB 104 stores: as a first permission, a condition regarding whether or not the access count of the user group is 0; as a first flag associated with the first permission, a flag indicating whether or not the access count of the user group is 0; as a second permission, a condition regarding whether or not it is during a campaign period; as a second flag associated with the second permission, a flag indicating whether or not it is during a campaign period; as a third permission, a statement for generating a random number and setting a value obtained by multiplying the random number by 1.2 in a variable A; and as a third flag associated with the third permission, a flag indicating whether or not the variable A is equal to or larger than 1.

More specifically, the action DB 104 stores an action of distributing an advertisement about the shop campaign to the user group, in association with a tag group identification number "TGAA100001" and a shop ID "S555777".

Further, the action DB 104 stores an action of distributing a coupon to the user group as well as setting the access count of the user group in the history DB 71, in association with: a tag group identification number "TGAA100002"; the shop ID "S555777"; the first flag, which is associated with the first permission regarding whether or not the access count of the user group is 0, indicating "1", which means that the access count of the user group is 0; the second flag, which is associated with the second permission regarding whether or not it is during a campaign period, indicating "1", which means that it is during a campaign period; and the third flag, which is associated with the third permission requesting generating a random number and setting a value obtained by multiplying the random number by 1.2 in a variable A, indicating that the variable A is equal to or larger than 1.

The action DB 104 stores an action of distributing a lost-lottery page to the user group as well as setting the access count of the user group in the history DB 71, in association with: the tag group identification number "TGAA100002"; the shop ID "S555777"; the first flag, which is associated with the first permission regarding whether or not the access count of the user group is 0, indicating "1", which means that the access count of the user group is 0; the second flag, which is associated with the second permission regarding whether or not it is during a campaign period, indicating "1", which means that it is during a campaign period; and the third flag, which is associated with the third permission requesting generating a random number and setting a value obtained by multiplying the random number by 1.2 in a variable A, indicating that the variable A is less than 1.

Further, the action DB 104 stores an action of distributing a page indicating that a coupon distribution period has expired to the user group, in association with: the tag group identification number "TGAA100002"; the shop ID "S555777"; the first flag, which is associated with the first permission regarding whether or not the access count of the user group is 0, indicating "1", which means that the access count of the user group is 0; and the second flag, which is associated with the second permission regarding whether or not it is during a campaign period, indicating "0", which means that it is not during a campaign period.

Further, the action DB 104 stores an action of distributing a page indicating confirmation of user's participation to the user group, in association with: the tag group identification number "TGAA100002"; the shop ID "S555777"; the first flag, which is associated with the first permission regarding whether or not the access count of the user group is 0, indicating "0", which means that the access count is not 0.

Further, the action DB 104 stores an action of distributing a point-get URL to the user group as well as setting the access count of the user group in the history DB 71, in association with: a tag group identification number "TGAA100003"; the shop ID "S555777"; the first flag, which is associated with the first permission regarding whether or not the access count of the user group is 0, indicating "1", which means that the access count of the user group is 0; and the second flag, which is associated with the second permission regarding whether or not it is during a campaign period, indicating "1", which means that it is during a campaign period. The action DB 104 stores an action of distributing a page indicating the campaign is finished to the user group as well as setting the access count of the user group in the history DB 71, in association with: the tag group identification number "TGAA100003"; the shop ID "S555777"; the first flag, which is associated with the first permission regarding whether or not the access count of the user group is 0, indicating "1", which means that the access count of the user group is 0; and the second flag, which is associated with the second permission regarding whether or not it is during a campaign period, indicating "0", which means that it is not during a campaign period.

Further, the action DB 104 stores an action of distributing an advertisement to the user group, in association with: the tag group identification number "TGAA100003"; the shop ID "S555777"; and the first flag, which is associated with the first permission regarding whether or not the access count of the user group is 0, indicating "0", which means that the access count of the user group is not 0.

Referring back to FIG. 12, the tag group DB 105 stores a tag group identification number and an individual identification number of the RFID tag 22 belonging to the tag group.

FIG. 14 is a table showing an example of data stored in the tag group DB 105. The tag group DB 105 stores a shop ID, a tag group identification number, an RFID count, which is a count of the RFID tags 22 belonging to the tag group, and an individual identification number of the RFID tag 22 belonging to the tag group.

More specifically, in the example illustrated in FIG. 14, the tag group DB 105 stores, in association with the shop ID "S555777" and the tag group identification number "TGAA100001", an RFID count "2" and individual identification numbers "AAA100001" and "AAA100002". Further, the tag group DB 105 stores, in association with the shop ID "S555777" and the tag group identification number "TGAA100002", an RFID count "2" and individual identification numbers "AAA100003" and "AAA100005". Still further, the tag group DB 105 stores, in association with the shop ID "S555777" and the tag group identification number "TGAA100003", an RFID count "3" and individual identification numbers "AAA100004", "AAA100006", and "AAA100007".

It should be noted that the action DB 104 and the tag group DB 105 may be realized by a single database.

Figure 15:
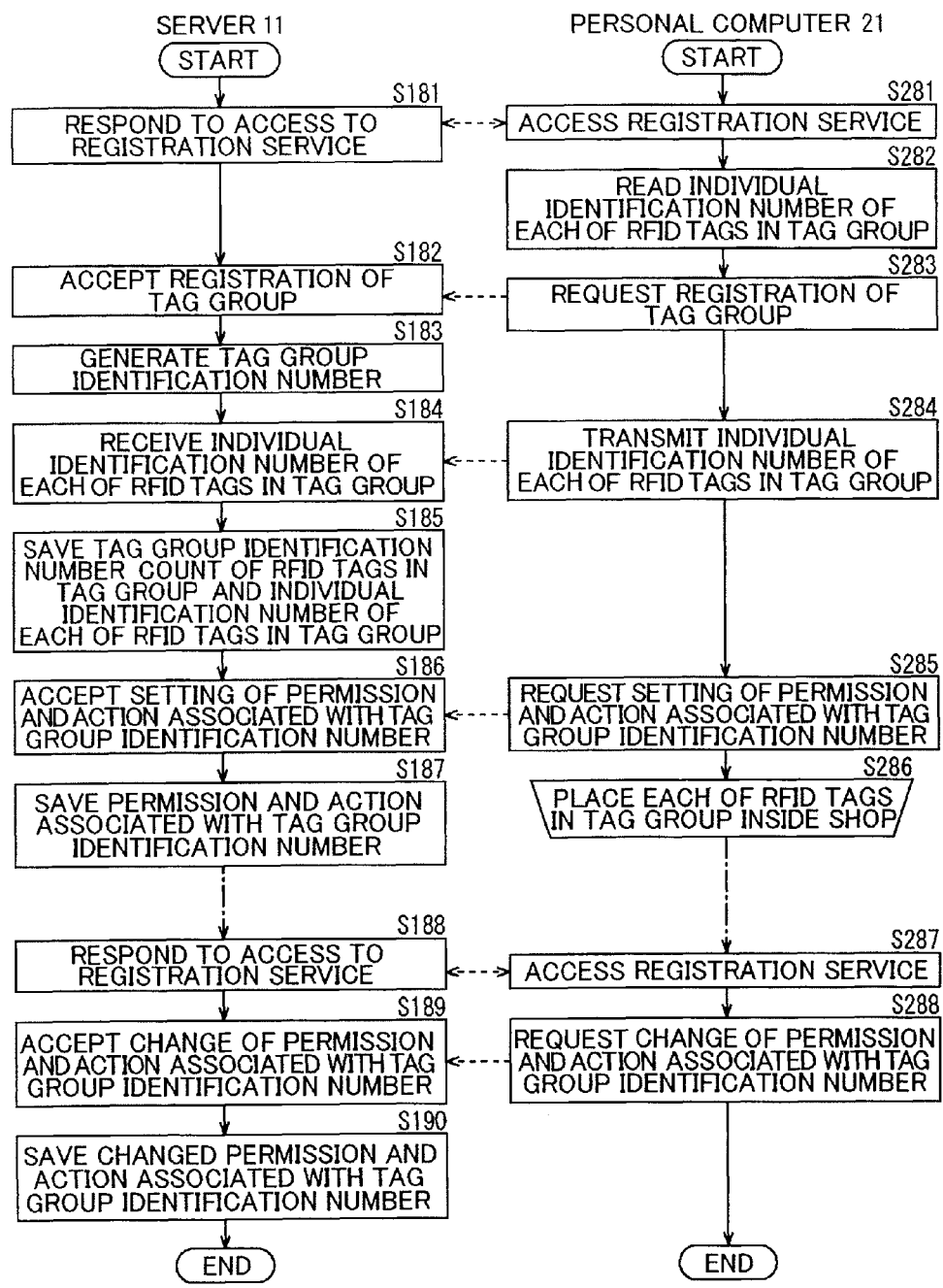
FIG. 15 is a flow chart illustrating another example of the registration processing.

Next, an example of registration processing is described with reference to a flow chart of FIG. 15. In Step S281, the personal computer 21 accesses a registration service of the server 11 via the Internet 12. In Step S181, the web server function 61 responds to the access to the registration service, which is made by the personal computer 21. In Step S282, the personal computer 21 reads an individual identification number from each of the RFID tags 22 in the tag group with the use of the reader connected thereto or incorporated therein. In Step S283, the personal computer 21 requests registration of the tag group via the Internet 12. In Step S182, the tag group registration processing section 101 uses the communication unit 39 to receive the request for registration of the tag group, which is transmitted from the personal computer 21, and accepts the registration of the tag group. In Step S183, the tag group registration processing section 101 generates a tag group identification number.

In Step S284, the personal computer 21 transmits, via the Internet 12 to the server 11, the individual identification number of each of the RFID tags 22 in the tag group. In Step S184, the tag group registration processing section 101 uses the communication unit 39 to receive the individual identification number of each of the RFID tags 22 in the tag group. In Step S185, the tag group registration processing section 101 supplies, to the tag group DB 105, the generated tag group identification number, the count of the RFID tags 22 in the tag group, and the individual identification number of each of the RFID tags 22 in the tag group. The tag group DB 105 saves (stores) the newly generated tag group identification number, the count of the RFID tags 22 in the tag group, and the individual identification number of each of the RFID tags 22 in the tag group.

In Step S285, the personal computer 21 transmits, via the Internet 12, a shop ID, the tag group identification number, a permission, a flag, and an action, and requests setting of the permission and the action associated with the tag group identification number. In Step S186, the action setting section 102 uses the communication unit 39 to receive the shop ID, the tag group identification number, the permission, the flag, and the action, which are transmitted from the personal computer 21, and accepts the setting of the permission and the action associated with the tag group identification number. In Step S187, the action setting section 102 saves the permission and the action associated with the tag group identification number, which are accepted for the setting. In other words, the action setting section 102 supplies, to the action DB 104, the shop ID, the tag group identification number, the permission, the flag, and the action. The action DB 104 saves (stores) the shop ID, the tag group identification number, the permission, the flag, and the action in association with one another.

In Step S286, the person in charge of the shop 13 places each of the RFID tags 22 in the tag group inside the shop 13.

In a case of changing the action associated with the tag group identification number, in Step S287, the personal computer 21 accesses the registration service of the server 11 via the Internet 12. In Step S188, the web server function 61 responds to the access to the registration service, which is made by the personal computer 21. In Step S288, the personal computer 21 transmits, via the Internet 12, a changed permission, a changed flag, or a changed action along with the shop ID and the tag group identification number, and requests the change of the permission and the action associated with the tag group identification number. In Step S189, the action setting section 102 uses the communication unit 39 to receive the shop ID and the tag group identification number, which are transmitted from the personal computer 21, and to further receive the changed permission, the changed flag, or the changed action, and accepts the change of the permission and the action associated with the tag group identification number. In Step S190, the action setting section 102 saves the changed permission and action associated with the tag group identification number. In other words, the action setting section 102 supplies, to the action DB 104, the shop ID, the tag group identification number, the changed permission, the changed flag, and the changed action. The action DB 104 saves the shop ID, the tag group identification number, the changed permission, the changed flag, and the changed action in association with one another. Then, the registration processing is ended.

As described above, the tag group identification number and the action are associated with each other. Associating the tag group identification number with the action may be performed with ease on the personal computer 21. It should be noted that the personal computer 21 may transmit, via the Internet 12, the shop ID, the tag group identification number, the individual identification number, the permission, the flag, and the action to request the setting of the permission and the action associated with the tag group identification number and the individual identification number, and the action setting section 102 may save, in the action DB 104, the permission and the action associated with the tag group identification number and the individual identification number.

Further, in the case of the registration, the server 11 may first read the individual identification number from the RFID tag 22, and then set the permission and the action.

Figure 8:
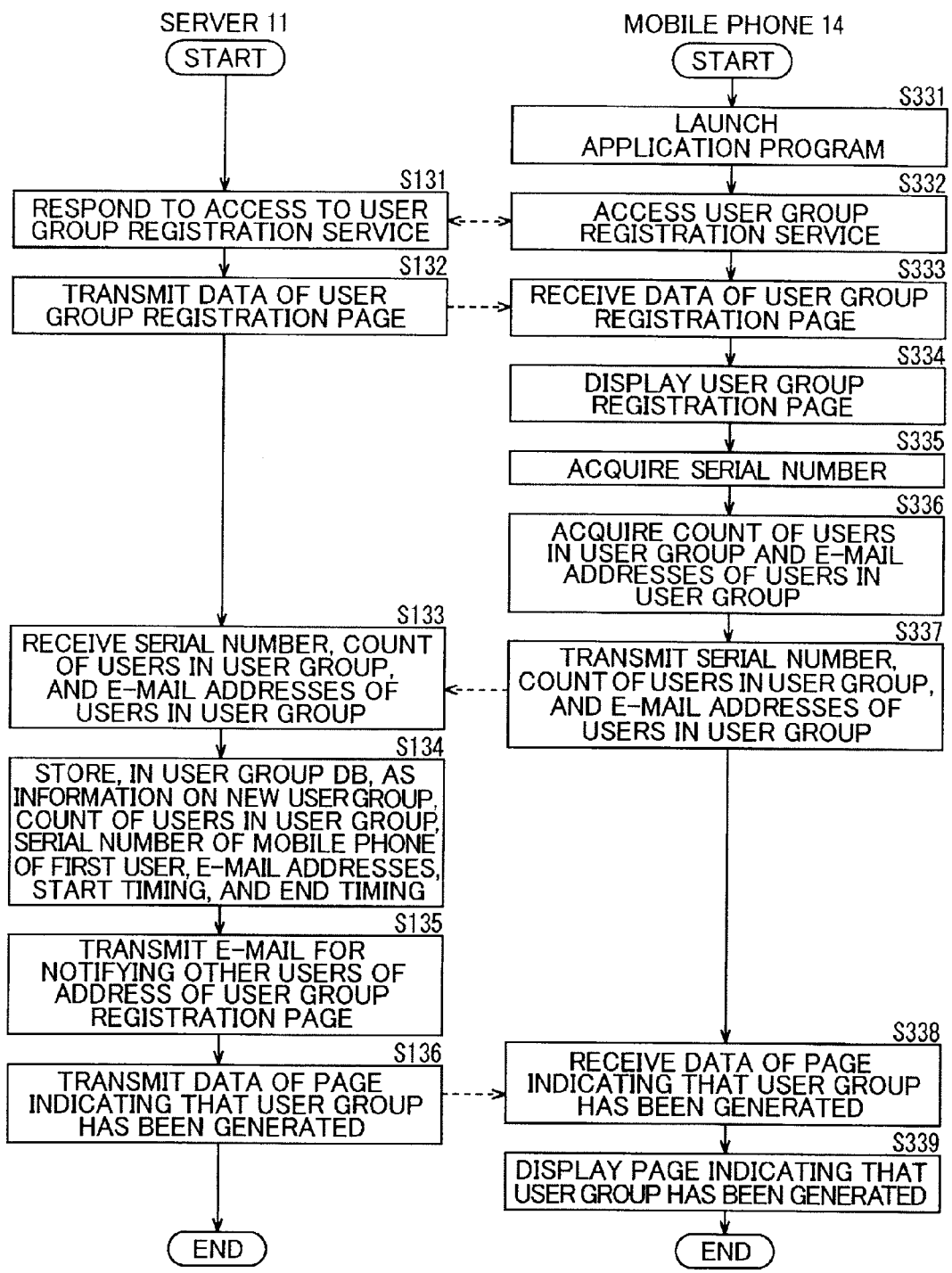
FIG. 8 is a flow chart illustrating processing of generating a user group.

Processing of generating a user group is the same as the processing described with reference to the flow chart of FIG. 8, and description thereof is therefore omitted herein. Processing of registering a serial number in the user group is the same as the processing described with reference to the flow chart of FIG. 9, and description thereof is therefore omitted herein.

Further, processing of searching for the RFID tag 22 is the same as the processing described with reference to the flow chart of FIG. 10, and description thereof is therefore omitted herein.

Figure 16:
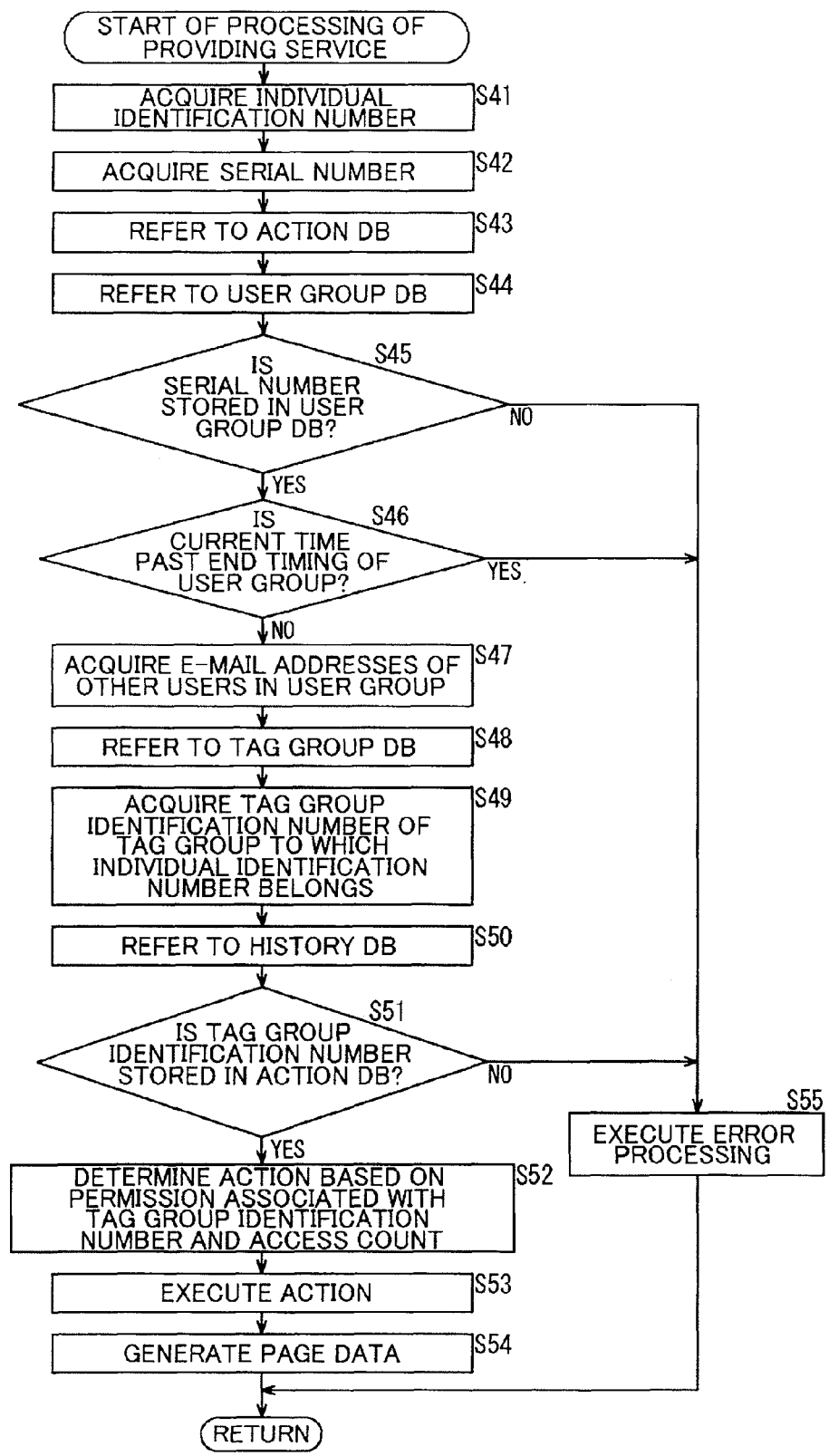
FIG. 16 is a flow chart illustrating another detailed example of the processing of providing a service.

Next, referring to the flow chart of FIG. 16, description is given of a detailed example of processing of providing a service, which is performed in a case of using the mobile phone 14 to read the RFID tags 22 belonging to a group. Processing of from Step S41 to Step S47 is the same as the processing of from Step S11 to Step S17 of FIG. 11, respectively, and description thereof is therefore omitted herein.

In Step S48, an action condition acquisition section 121 refers to the tag group DB 105 to read, from the tag group DB 105, a record of a tag group including the individual identification number acquired in the processing of Step S41. The record of a tag group includes a shop ID, a tag group identification number, an RFID count, and an individual identification number, which relate to the corresponding tag group. In Step S49, the action condition acquisition section 121 acquires, from the read record, a tag group identification number of the tag group to which the individual identification number belongs (to which the RFID tag 22 having the individual identification number belongs).

In Step S50, the action condition acquisition section 121 refers to the history DB 71 to read an access count of the user group from the history DB 71.

In Step S51, a registration judgment section 122 judges whether or not the acquired tag group identification number is stored in the action DB 104. If it is judged in Step S51 that the tag group identification number is stored in the action DB 104, the procedure advances to Step S52, and an action determination section 123 determines an action based on the permission associated with the tag group identification number and the access count of the user group. In Step S53, an action execution section 124 executes the determined action in the same manner as in the processing of Step S21.

In Step S54, the page data generation section 62 generates page data corresponding to the executed action. Then, the processing of providing a service is ended. If it is judged in Step S51 that the tag group identification number is not stored in the action DB 104, the procedure advances to Step S55, and the service providing section 103 executes error processing. Then, the processing of providing a service is ended.

If it is judged in Step S46 that the current time point is past the end timing of the user group, the procedure advances to Step S55, and the service providing section 103 executes the error processing. Then, the processing of providing a service is ended. Further, if it is judged in Step S45 that the serial number is not stored in the user group DB 70, the procedure advances to Step S55, and the service providing section 103 executes the error processing. Then, the processing of providing a service is ended.

In this manner, when any one of customers (users) in the user group uses the mobile phone 14 to read the individual identification number of any one of the RFID tags 22 belonging to the tag group, the shop 13 can provide a service to all the customers (users) belonging to the user group.

Further, reading of the individual identification numbers of all the RFID tags 22 belonging to the tag group may allow the shop 13 to provide a service to all the customers (users) belonging to the user group.

FIG. 17 is a table showing another example of the data stored in the action DB 104. In the example illustrated in FIG. 17, the action DB 104 stores: a tag group identification number; a shop ID; an individual identification number; tag group individual identification numbers; flags associated with the tag group individual identification numbers; a permission regarding whether or not the access count of the user group is 0; a flag associated with the permission; and an action. The tag group individual identification number is an individual identification number of the RFID tag 22 belonging to the tag group, and is different from the individual identification number transmitted from the mobile phone 14. The flag associated with the tag group individual identification number indicates whether or not the RFID tag 22 having the corresponding tag group individual identification number has already been accessed by a customer (user) belonging to the user group. The flag associated with the permission indicates whether or not the access count of the user group is 0.

In the example illustrated in FIG. 17, in association with the tag group identification number "TGAA100001", the shop ID "S555777", and the individual identification number "AAA100001", the action DB 104 stores an action of distributing a coupon to the user group as well as setting an access count of the individual identification number and the access count of the user group in the history DB 71, in association with: the flag, which is associated with a tag group individual identification number "AAA100002", indicating "1", which means that the tag group individual identification number "AAA100002" has been read by the mobile phone 14 of any one of the users in the user group; and the flag, which is associated with the permission regarding whether or not the access count of the user group is 0, indicating "1", which means that the access count of the user group is 0.

Further, in association with the tag group identification number "TGAA100001", the shop ID "S555777", and the individual identification number "AAA100001", the action DB 104 stores an action of distributing a page indicating confirmation of user's participation to the user group, in association with: the flag, which is associated with the tag group individual identification number "AAA100002", indicating "1", which means that the tag group individual identification number "AAA100002" has been read by the mobile phone 14 of any one of the users in the user group; and the flag, which is associated with the permission regarding whether or not the access count of the user group is 0, indicating "0", which means that the access count of the user group is not 0. Still further, in association with the tag group identification number "TGAA100001", the shop ID "S555777", and the individual identification number "AAA100001", the action DB 104 stores an action of distributing a page displaying "one more left" to the user group as well as setting the access count of the individual identification number in the history DB 71, in association with the flag, which is associated with the tag group individual identification number "AAA100002", indicating "0", which means that the tag group individual identification number "AAA100002" has not been read by the mobile phone 14 of any users in the user group.

Still further, in association with the tag group identification number "TGAA100001", the shop ID "S555777", and the individual identification number "AAA100002", the action DB 104 stores an action of distributing a coupon to the user group as well as setting the access count of the individual identification number and the access count of the user group in the history DB 71, in association with: the flag, which is associated with a tag group individual identification number "AAA100001", indicating "1", which means that the tag group individual identification number "AAA100001" has been read by the mobile phone 14 of any one of the users in the user group; and the flag, which is associated with the permission regarding whether or not the access count of the user group is 0, indicating "1", which means that the access count of the user group is 0.

Further, in association with the tag group identification number "TGAA100001", the shop ID "S555777", and the individual identification number "AAA100002", the action DB 104 stores an action of distributing a page indicating confirmation of user's participation to the user group, in association with: the flag, which is associated with the tag group individual identification number "AAA100001", indicating "1", which means that the tag group individual identification number "AAA100001" has been read by the mobile phone 14 of any one of the users in the user group; and the flag, which is associated with the permission regarding whether or not the access count of the user group is 0, indicating "0", which means that the access count of the user group is not 0. Still further, in association with the tag group identification number "TGAA100001", the shop ID "S555777", and the individual identification number "AAA100002", the action DB 104 stores an action of distributing a page displaying "one more left" to the user group as well as setting the access count of the individual identification number in the history DB 71, in association with the flag, which is associated with the tag group individual identification number "AAA100001", indicating "0", which means that the tag group individual identification number "AAA100001" has not been read by the mobile phone 14 of any users in the user group.

In a similar manner, in association with the tag group identification number "TGAA100002", the shop ID "S555777", and the individual identification number "AAA100003" or "AAA100005", the action DB 104 stores: a tag group individual identification number "AAA100005" or "AAA100003" and a flag associated therewith; the permission regarding whether or not the access count of the user group is 0 and a flag associated therewith; and an action. Further, in a similar manner, in association with the tag group identification number "TGAA100003", the shop ID "S555777", and the individual identification number "AAA100004", "AAA100006", or "AAA100007", the action DB 104 stores: two tag group individual identification numbers out of tag group individual identification numbers "AAA100004", "AAA100006", and "AAA100007" (which are different from the individual identification number transmitted from the mobile phone 14) and two flags associated therewith; the permission regarding whether or not the access count of the user group is 0 and a flag associated therewith; and an action.

Figure 18:
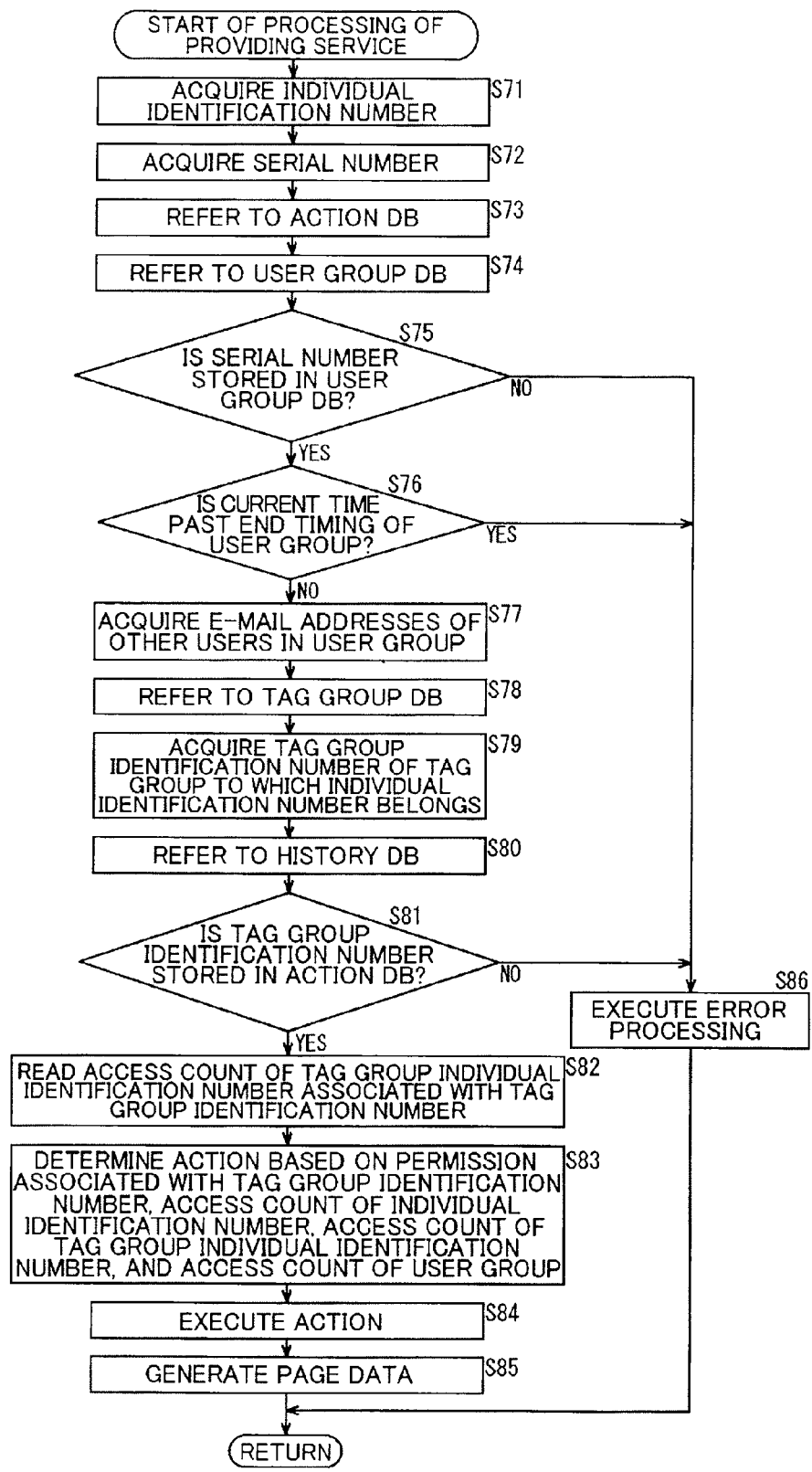
FIG. 18 is a further detailed example of the processing of providing a service.

Next, referring to the flow chart of FIG. 18, description is given of a detailed example of processing of providing a service, which is performed in a case of providing a service to all the users belonging to the user group in response to reading of the individual identification numbers of all the RFID tags 22 belonging to the tag group. Processing steps from Step S71 to Step S81 are the same as the processing steps from Step S41 to Step S51 of FIG. 16, respectively, and description thereof is therefore omitted herein.

If it is judged in Step S81 that the tag group identification number is stored in the action DB 104, the procedure advances to Step S82, and the action condition acquisition section 121 refers to the history DB 71 to read, from the history DB 71, an access count of the tag group individual identification number associated with the tag group identification number.

In Step S83, the action determination section 123 determines an action based on the permission associated with the tag group identification number, the access count of the individual identification number, the access count of the tag group individual identification number, and the access count of the user group.

Processing steps from Step S84 to Step S86 are the same as processing steps from Step S53 to Step S55 of FIG. 16, respectively, and description thereof is therefore omitted herein.

In this manner, when the individual identification numbers of all the RFID tags 22 belonging to the tag group are read, the shop 13 can provide a service to all the customers (users) belonging to the user group.

As described above, in a shop which an indefinite number of customers (users) visit, when the mobile phone 14 is used to read the plurality of RFID tags 22 attached to the plurality of equipments of the shop 13, the shop can provide a desired service to the group of customers according to situations. Once the RFID tags 22 are placed, access from the personal computer 21 to the server 11 for the change of the permission and the action is only necessary to change the service which is to be provided when the RFID tag 22 is read.

It should be noted that the plurality of RFID tags 22 may be placed across a plurality of the shops 13. For example, one or a plurality of RFID tags 22 may be placed in shops 13 that serve respectively as a nail salon, a hair salon, and an aesthetic salon, and reading of the whole or a predetermined combination of the RFID tags 22 may trigger the execution of an action. As an alternative example, the plurality of RFID tags 22 may be placed on the floors of the shop 13 such as a department store.

As described above, storage relation between a terminal device identification number for specifying a terminal device of a user belonging to a user group and an end timing of a valid period of the user group is controlled, storage relation between an individual identification number for identifying an ID tag of non-contact type which is set up by a service provider and an action associated with the individual identification number is controlled, reception of a request for registration of the user group, which is transmitted along with the terminal device identification number from the terminal device, is controlled, reception of the terminal device identification number and the individual identification number, which are transmitted from the terminal device which has read the ID tag, is controlled, and, if a current time point is not past the end timing of the user group when the terminal device identification number and the individual identification number are received, an action of providing a service of the service provider to the terminal device of the user belonging to the user group, which is identified by the terminal device identification number, is executed, the action being stored in association with the individual identification number. Through this processing, in a shop or a service providing place which an indefinite number of customers (users) visit, the service provider can provide a desired service to the group of customers according to situations.

The description has been given that the serial number of the mobile phone 14 is used, but such information only needs to specify the mobile phone 14 and is not limited to the serial number. As terminal device specifying information for specifying the mobile phone 14 serving as the terminal device, a subscriber number (subscriber ID), a user ID, an IP address, or an arbitrarily and uniquely set ID may be used instead of the serial number.

Further, the description has been given that the action involves distribution of an advertisement, a coupon, a page, or a URL, but the action is not limited thereto as long as the action is the service of the shop 13 (including the service of the service provider). For example, an action of providing a point, an image, music, or a password may be employed because the action is executed for providing a benefit to the customer (user).

The above-mentioned series of processing steps may be executed by hardware or software.

It should be noted that the program executed by the computer may be a program with which the processing steps are executed in time series in the order described herein, or a program with which the processing steps are executed in parallel or at such a necessary timing as when call processing is executed.

While there have been described what are at present considered to be certain embodiments of the invention, it will be understood that various modifications may be made thereto, and it is intended that the appended claims cover all such modifications as fall within the scope of the invention.

The invention claimed is:

1. An information providing device, comprising:
at least one computer-readable non-transitory memory operable to store computer instructions;
at least one processor operable to read said instructions from said memory and execute said instructions;
first storage control means for controlling storing a terminal device identification number for specifying a terminal device of a user, and associating said user with a user group;
second storage control means for controlling storing an individual identification number for identifying an ID tag of non-contact type which is set up by a service provider and an action associated with the individual identification number;
reception control means for controlling reception of the terminal device identification number and the individual identification number, which are transmitted from the terminal device which has read the ID tag;
third storage control means for controlling storing a count for each user group, which indicates a number of times the individual identification number has been received; and
execution means for executing, when the terminal device identification number and the individual identification number are received, an action of providing a service of the service provider to the terminal device of at least one user belonging to the user group, the action being stored in association with the individual identification number;
wherein the reception controls means controls reception of a request for registration of the user group, the request being transmitted along with the terminal device identification number from the terminal device; and
wherein the execution means causes the count for the each user group, which indicates the number of times the individual identification number has been received, to be stored, and executes the action associated with the count for the each user group, which indicates the number of times the individual identification number has been received.

2. The information providing device according to claim 1, wherein:
the first storage control means controls storing an end timing of a valid period of the user group; and
the action executed by the execution means is, if a current time point is not past the end timing of the user group when the terminal device identification number and the individual identification number are received, provided to the terminal device of the user, the action being stored in association with the individual identification number.

3. The information providing device according to claim 2, wherein the first storage control means controls storing the end timing, the end timing being obtained by adding a predetermined period of time to a time point at which the request for the registration of the user group is received.

4. The information providing device according to claim 1, wherein:
the reception control means controls reception of a request for setting of the action, which is transmitted from an information processing device of the service provider; and
the second storage control means controls storing the individual identification number and the action when the request for the setting of the action is made.

5. The information providing device according to claim 1, wherein:
the reception control means controls reception of a request for change of the action, which is transmitted from an information processing device of the service provider; and
the first storage control means controls storing the individual identification number and the action which has been subjected to the change.

6. An information providing method, comprising:
controlling storing a terminal device identification number for specifying a terminal device of a user and associating said user with a user group;
controlling storing an individual identification number for identifying an ID tag of non-contact type which is set up by a service provider and an action associated with the individual identification number;
controlling reception of the terminal device identification number and the individual identification number, which are transmitted from the terminal device which has read the ID tag;
controlling storing a count for each user group, which indicates a number of times the individual identification number has been received; and
executing, when the terminal device identification number and the individual identification number are received, an action of providing a service of the service provider to the terminal device of at least one user belonging to the user group, the action being stored in association with the individual identification number;
wherein further comprising:
controlling reception of a request for registration of the user group, the request being transmitted along with the terminal device identification number from the terminal disclaimer device; and
causing the count for each user group, which indicates the number of times the individual identification number has been received, to be stored, and executes the action associated with the count for the each user group, which indicates the number of times the individual identification number has been received.

7. A program stored on a non-transitory computer-readable memory for controlling a computer to perform information providing processing comprising:
controlling storing a terminal device identification number for specifying a terminal device of a user and associating said user with a user group;
controlling storing an individual identification number for identifying an ID tag of non-contact type which is set up by a service provider and an action associated with the individual identification number;

controlling reception of the terminal device identification number and the individual identification number, which are transmitted from the terminal device which has read the ID tag;

controlling storing a count for each user group, which indicates a number of times the individual identification number has been received; and executing, when the terminal device identification number and the individual identification number are received, an action of providing a service of the service provider to the terminal device of at least one user of the user group, the action being stored in association with the individual identification number;

wherein further comprising:

controlling reception of a request for registration of the user group, the request being transmitted along with the terminal device identification number from the terminal disclaimer device; and causing the count for each user group, which indicates the number of times the individual identification number has been received, to be stored, and executes the action associated with the count for the each user group, which indicates the number of times the individual identification number has been received.

8. A non-transitory computer-readable storage medium having a program stored therein, the program controlling a computer to perform information providing processing comprising:

controlling storing a terminal device identification number for specifying a terminal device of a user, and associating said user with a user group;

controlling storing an individual identification number for identifying an ID tag of non-contact type which is set up by a service provider and an action associated with the individual identification number;

controlling reception of the terminal device identification number and the individual identification number, which are transmitted from the terminal device which has read the ID tag; and executing, when the terminal device identification number and the individual identification number are received, an action of providing a service of the service provider to the terminal device of at least one user in the user group, the action being stored in association with the individual identification number;

wherein further comprising:

controlling reception of a request for registration of the user group, the request being transmitted along with the terminal device identification number from the terminal disclaimer device; and causing the count for each user group, which indicates the number of times the individual identification number has been received, to be stored, and executes the action associated with the count for the each user group, which indicates the number of times the individual identification number has been received.

* * * * *